United States Patent [19]
Barrus et al.

[11] Patent Number: 6,058,397
[45] Date of Patent: May 2, 2000

[54] 3D VIRTUAL ENVIRONMENT CREATION MANAGEMENT AND DELIVERY SYSTEM

[75] Inventors: John Barrus, Menlo Park; Stephan McKeown; Ilene B. Sterns, both of Los Altos, all of Calif.

[73] Assignee: Mitsubishi Electric Information Technology Center America, Inc., Cambridge, Mass.

[21] Appl. No.: 08/835,497

[22] Filed: Apr. 8, 1997

[51] Int. Cl.[7] .................................................. G06F 17/30
[52] U.S. Cl. .................... 707/104; 707/102; 345/302; 345/329; 345/473; 345/474; 705/35
[58] Field of Search .................................. 707/500, 104, 707/102; 382/154; 705/35; 345/329, 302, 474, 473

[56] References Cited

U.S. PATENT DOCUMENTS

| | | | |
|---|---|---|---|
| 4,807,158 | 2/1989 | Blanton et al. | 395/125 |
| 5,261,014 | 11/1993 | Bruno et al. | 385/14 |
| 5,261,041 | 11/1993 | Susman | 395/173 |
| 5,310,349 | 5/1994 | Daniels et al. | 434/350 |
| 5,459,382 | 10/1995 | Jacobus et al. | 318/568.11 |
| 5,537,524 | 7/1996 | Aprile | 395/140 |
| 5,617,515 | 4/1997 | MacLaren et al. | 395/99 |
| 5,623,582 | 4/1997 | Rosenberg | 395/99 |
| 5,629,594 | 5/1997 | Jacobus et al. | 318/568.11 |
| 5,659,691 | 8/1997 | Durward et al. | 345/329 |
| 5,675,721 | 10/1997 | Freedman et al. | 395/129 |
| 5,675,746 | 10/1997 | Marshall | 395/235 |

(List continued on next page.)

OTHER PUBLICATIONS

Bently Inaugurates Engineering Back Office Nov. 7, 1996 Internet.
Apple Taps Cinebase Software as Key Partner Apr. 11, 1996 Internet.
Adaptive Media Brings "Just in Time" Visual Information Apr. 28, 1996 Internet.
Problems in Designing Large Seale Virtual Environment Database Deyo and Isaacson First Workshop on Simulation and Interaction in Virtual Environments Jul. 13, 1995.
Network–based 3D Streaming May 12, 1997 Internet.
Cinebase Software dms Apr. 1997 Internet.
What is Media Asset Management, bulldog one.six version, the Bulldog Group, Inc. no date.
Bentley Mode Server Publisher, copyright 1996 no date Internet.
Bentley Tags Oracle (R) Universal Server Spatial Data Option for Enterprise Management of Engineering Data Apr. 1997 Internet.
Apple to demo new QuickTime 3 Plug–in no date MAC Week.
Real–Time Distributed Object Management for Large Scale Environment Simulator, Deyo, Fitzgerald, Isaacson Dec. 2, 1996 ITSEC Conference.
Work Center Strategy, Autodesk Aug. 16, 1996 Internet.
Web–Based Access to Documents Organized in Work–Center (R) copyright 1997 no date Internet.
The Engine of Change: The Documentation DocPage Server Mar. 24, 1997 Internet.

*Primary Examiner*—Wayne Amsbury
*Assistant Examiner*—Jean M. Corrielus
*Attorney, Agent, or Firm*—Dirk Brinkman

[57] ABSTRACT

A virtual reality environment creation, modification and delivery system stores information representing the virtual reality environment in a database where portions of it may be created, modified or delivered without affecting other portions. The database may be accessed, for example, over a network such as a wide area network, to allow database records to be individually updated without affecting other records in the database. In this manner, it is not necessary to read and store an entire virtual reality environment file in order to make changes to it. In addition, characteristics of target machines dictate what version the database reads out, thus to provide a version compatible with the target machine.

50 Claims, 26 Drawing Sheets

Microfiche Appendix Included
(4 Microfiche, 301 Pages)

U.S. PATENT DOCUMENTS

| | | | |
|---|---|---|---|
| 5,684,943 | 11/1997 | Abraham et al. | 395/173 |
| 5,710,875 | 1/1998 | Harashima et al. | 345/419 |
| 5,721,691 | 2/1998 | Wuller et al. | 364/512 |
| 5,727,186 | 3/1998 | Shervington et al. | 395/500 |
| 5,748,199 | 5/1998 | Palm | 345/473 |
| 5,759,044 | 6/1998 | Redmond | 434/307 R |
| 5,764,241 | 6/1998 | Elliot et al. | 345/473 |
| 5,764,980 | 6/1998 | Davis et al. | 707/104 |
| 5,767,852 | 6/1998 | Keller et al. | 345/348 |
| 5,774,878 | 6/1998 | Marshall | 705/35 |
| 5,781,913 | 7/1998 | Felsenstein et al. | 707/501 |
| 5,784,569 | 7/1998 | Miller et al. | 395/200.65 |
| 5,790,549 | 8/1998 | Dent | 370/479 |
| 5,793,382 | 8/1998 | Yerazunis et al. | 345/474 |
| 5,807,114 | 9/1998 | Hodges et al. | 434/236 |
| 5,808,612 | 9/1998 | Merrick et al. | 345/351 |
| 5,812,134 | 9/1998 | Pooser et al. | 345/356 |
| 5,828,369 | 10/1998 | Foster | 345/302 |
| 5,831,619 | 11/1998 | Nakagawa et al. | 345/419 |
| 5,877,778 | 3/1999 | Dow et al. | 345/474 |
| 5,889,951 | 3/1999 | Lombardi | 709/219 |

LOW RESOLUTION
GIF FORMAT
8 BIT COLOR
32 X 32 PIXELS
2 K/BYTES
0.71 SEC.
DOWNLOAD TIME

MEDIUM RESOLUTION
GIF FORMAT
8 BIT COLOR
128 X 128 PIXELS
8 K/BYTES
2.8 SEC.
DOWNLOAD TIME

HIGH RESOLUTION
PNG OR TIFF FORMAT
24 BIT COLOR
1024 X 1024 PIXELS
1,720 K/BYTES
9.9 MIN.
DOWNLOAD TIME
OVER
28.8 Kband MODEM

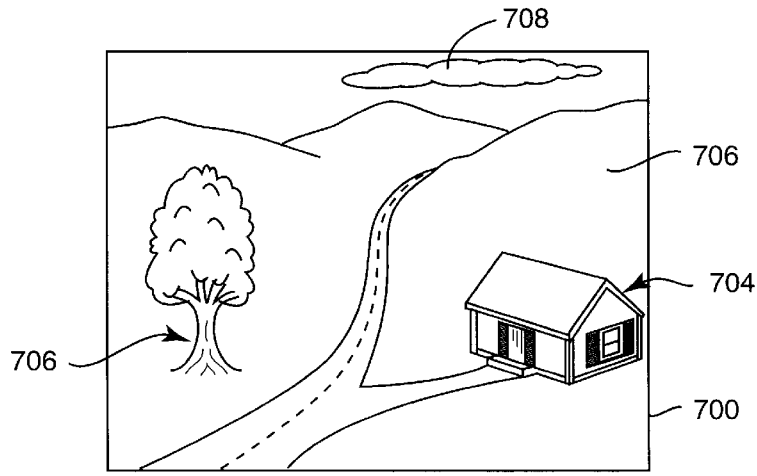
FIG. 7A
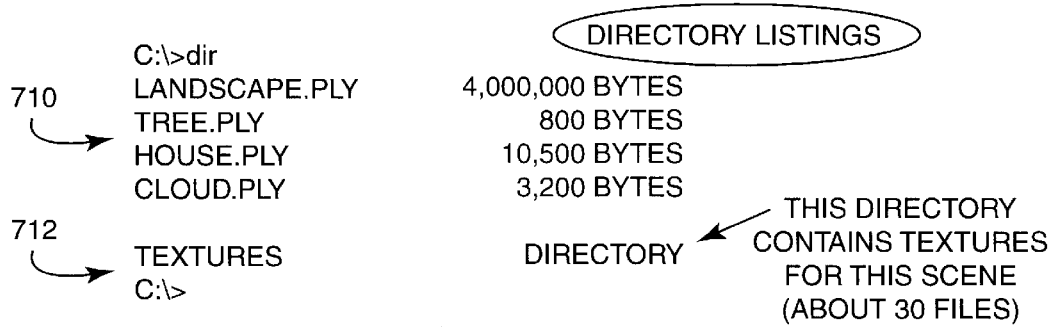
FIG. 7B
FIG. 7C

```
#VRML Draft #2 V2. 0 utf8

WorldInfo {
        title "Built by John W. Barrus"
        info "Teaot, cone, and cube on a table with 4 legs"
}
DEF Camera Viewpoint {
        position 78.699 - 66.361 48.663
        orientation 0.79102 0.38037 0.47918 1.5743
        fieldOfView 0.7854
        description "Camera"
}
DEF TableTop-ROOT Transform {
        translation -0.048722 0.28994 25.956
---------- DATA GOES HERE ---------
}
DEF Leg1-ROOT Transform {
        translation -29.911 -9.9842 0
---------- DATA GOES HERE -----------
}
DEF Leg2-ROOT Transform {
        translation - 29.911 -10.057 0
---------- DATA GOES HERE ------------
}
DEF Leg3-ROOT Transform {
        translation 30.288 -10.025 0
}
DEF Leg4-ROOT Transform {
        translation 30.288 9.9842 0
---------- DATA GOES HERE ---------
}
DEF Teapot-ROOT Transform {
        translation -13.232 0 26.515
---------- DATA GOES HERE -----------
}
DEF Cone-ROOT Transform {
        translation -2.679 -6.7673 26.691
---------- DATA GOES HERE ------------
}
DEF Box-ROOT Transform {
        translation -1.9229 4.2667 26.689
---------- DATA GOES HERE -------------
}
```

FIG. 9

```
#VRML Draft #2 V2.0 utf8

WorldInfo {
        title "Built by John W. Barrus"
        info "Teapot, cone, and cube on a table with 4 legs"
}
•
•
•
DEF TableTop-ROOT Transform {
        translation 0.048722 0.28994 25.956
        children {
                Shape {
                        appearance Appearance {
                                material Material {
                                        diffuseColor 0.7 0.7 0.7
                                        specularColor 0.9 0.9 0.9
                                        shininess 0.4
                                        transparency 0
                                }
                                texture ImageTexture {
                                        url "oakqrtrt.jpg"
                                }
                        }
                        geometry IndexedFaceSet {
                                cow TRUE
                                coord Coordinate { point [
                                        -36 -18  0,
                                        36 - 18  0,
                                        -36  18  0,
                                        36  18  0,
                                        -36 -18  0.75,
                                        36 -18  0.75,
                                        -36  18  0.75,
                                        36  18  0.75}
                                }
                                normal Normal { vector [
                                        1 0 0,
                                        -1 0 0,
                                        0 0 1,
                                        0 -1 0,
                                        0 0 -1,
                                        0 1 0,
                                ]    }
                                normalPerVertex True
                                texCoord TextureCoordinate { point [
                                        0 0,
                                        1 0,
                                        0 1,
                                        1 1,
                                        0 0,
                                        1 0,
                                        0 1,
                                        1 1,
                                        0 0,
                                        1 0,
                                        0 1,
                                        1 0]
                                }
                                coordIndex [
                                        0, 2, 3, -1.
```

FIG. 10

```
            3, 1, 0, -1,
            4, 5, 7, -1,
            7, 6, 4, -1,
            0, 1, 5, -1,
            5, 4, 1, -1,
            1, 3, 7, -1,
            7, 5, 1, -1,
            3, 2, 6, -1,
            6, 7, 3, -1,
            2, 0, 4, -1,
            4, 6, 2, -1,]
texCoordIndex   [
            9, 11, 10, -1,
            10, 8, 9, -1,
            8, 9, 11, -1,
            11, 10, 8, -1,
            4, 5, 7, -1,
            7, 6, 4, -1,
            0, 1, 3, -1,
            3, 2, 0, -1,
            4, 5, 7, -1,
            7, 6, 4, -1,
            0, 1, 3, -1,
            3, 2, 0, -1]
normalIndex   [
            4, 4, 4, -1,
            4, 4, 4, -1,
            2, 2, 2, -1,
            2, 2, 2, -1,
            3, 3, 3, -1,
            3, 3, 3, -1,
            0, 0, 0, -1,
            0, 0, 0, -1,
            5, 5, 5, -1,
            5, 5, 5, -1,
            1, 1, 1, -1,
            1, 1, 1, -1,
```

FIG. 10
(CONTINUED)

Locale Info: Table

| LOCALE ID | NAME | DEFAULT HEIGHT | COMMENTS |
|---|---|---|---|
| 0 | Room with Table | 1 | This room will contain a table, a teapot, cone, and cube. |

Composition List: Table

| LOCALE ID | COMPOSITION ID | MAJOR VERSION | MINOR VERSION | NAME | INSERTION DATE |
|---|---|---|---|---|---|
| 0 | 0 | 0 | 1 | Table | 3/22/97 |
| 0 | 1 | 0 | 1 | Teapot | 3/22/97 |
| 0 | 2 | 0 | 2 | Cone | 3/22/97 |
| 0 | 3 | 0 | 1 | Cube | 3/22/97 |
| 0 | 0 | 0 | 0 | | |

FIG. 13

Parts List: Table (1600)

| COMPOSITION ID | PART ID | INSERTION DATE | POS X | POS Y | POS Z | q1 | q2 | q3 | SCALE X | SCALE Y | SCALE Z |
|---|---|---|---|---|---|---|---|---|---|---|---|
| 0 | 0 | 3/22/97 | 0.048722 | 0.28994 | 25.956 | 0 | 0 | 0 | 1 | 1 | 1 |
| 1 | 1 | 3/22/97 | -13.232 | 0 | 25.515 | 0 | 0 | 0 | 1 | 1 | 1 |
| 2 | 2 | 3/22/97 | -2.679 | -6.7673 | 26.691 | 0 | 0 | 0 | 1 | 1 | 1 |
| 3 | 3 | 3/22/97 | -1.9229 | 4.2667 | 26.689 | 0 | 0 | 0 | 1 | 1 | 1 |
| 4 | 4 | 3/22/97 | -29.911 | 9.9842 | 0 | 0 | 0 | 0 | 1 | 1 | 1 |
| 5 | 5 | 3/22/97 | -29.911 | -10.057 | 0 | 0 | 0 | 0 | 1 | 1 | 1 |
| 6 | 6 | 3/22/97 | -30.288 | -10.025 | 0 | 0 | 0 | 0 | 1 | 1 | 1 |
| 7 | 7 | 3/22/97 | -30.288 | 9.9842 | 0 | 0 | 0 | 0 | 1 | 1 | 1 |
| 0 | 0 | | 0 | 0 | 0 | 0 | 0 | 0 | | | |

Part: Table (1602)

| PART ID | PRIMITIVE ID | MAJOR VERSION | MINOR VERSION | AUTHOR | CREATION DATE | MOD DATE |
|---|---|---|---|---|---|---|
| 0 | 0 | 0 | 1 | Einstein | 3/21/97 | 3/23/97 |
| 1 | 1 | 0 | 1 | Washington | 3/21/97 | 3/23/97 |
| 2 | 2 | 0 | 2 | Einstein | 3/21/97 | 3/23/97 |
| 3 | 3 | 0 | 2 | Escher | 3/21/97 | 3/23/97 |
| 4 | 4 | 0 | 1 | Einstein | 3/21/97 | 3/23/97 |
| 5 | 4 | 0 | 2 | Escher | 3/21/97 | 3/23/97 |
| 6 | 4 | 0 | 2 | Escher | 3/21/97 | 3/23/97 |
| 7 | 4 | 0 | 4 | Escher | 3/21/97 | 3/23/97 |
| 0 | 0 | 0 | 0 | Einstein | 3/31/97 | 3/31/97 |

Primitive Table (1604)

| PRIMITIVE ID | TYPE | FILE | DATA FORMAT | LANGUAGE | FACES | VERTICES | X SIZES | Y SIZES | Z SIZES | X MIN | Y MIN | Z MIN |
|---|---|---|---|---|---|---|---|---|---|---|---|---|
| 0 | Cube | tableTop.3ds | 3DSMAX | * | 12 | 8 | 72 | 36 | 0.75 | -36 | -18 | 0 |
| 1 | Teapot | teapot.3ds | 3DSMAX | * | 256 | 138 | 8.834 | 5.497 | 4.329 | -4.417 | -2.648 | 0 |
| 2 | Cone | cone.wrl | VRML | * | 48 | 26 | 2 | 2 | 2 | -1 | -1 | 0 |
| 3 | Cube | cube.wrl | VRML | * | 12 | 8 | 3 | 3 | 3 | -1.5 | -1.5 | 0 |
| 4 | Cylinder | tableLegs.iv | Inventor | * | 24 | 14 | 2 | 1.76 | 26 | -1 | -0.88 | 0 |
| 0 | | | | | 0 | 0 | 0 | 0 | 0 | 0 | 0 | 0 |

FIG. 16

Part: Table

| PART ID | PRIMITIVE ID | MAJOR VERSION | MINOR VERSION | AUTHOR | CREATION DATE | MOD DATE |
|---------|--------------|---------------|---------------|--------|---------------|----------|
| 0 | 0 | 0 | 1 | Einstein | 3/21/97 | 3/23/97 |
| 1 | 1 | 0 | 1 | Washington | 3/21/97 | 3/23/97 |
| 2 | 2 | 0 | 2 | Einstein | 3/21/97 | 3/23/97 |
| 3 | 3 | 0 | 2 | Escher | 3/21/97 | 3/23/97 |
| 4 | 4 | 0 | 1 | Einstein | 3/21/97 | 3/23/97 |
| 5 | 4 | 0 | 2 | Escher | 3/21/97 | 3/23/97 |
| 6 | 4 | 0 | 2 | Escher | 3/21/97 | 3/23/97 |
| 7 | 4 | 0 | 4 | Escher | 3/21/97 | 3/31/97 |
| 0 | 0 | 0 | 0 | Einstein | 3/31/97 | 3/31/97 |

FIG. 17A

Author Info Table

| AUTHOR ID | FIRST NAME | LAST NAME | GROUP | IS SUPERVISOR? |
|-----------|------------|-----------|-------|----------------|
| 0 | Albert | Einstein | Projects | ☐ |
| 1 | George | Washington | Projects | ☑ |
| 2 | MC | Escher | Projects | ☐ |
| 0 | | | | ☐ |

FIG. 17B

FILE: CUBE.WRL

```
#VRML Draft #2 V2.0 utf8

WorldInfo {
        title "Built by John W. Barrus"
        infor "cube "
}
DEF Cube Transform }
        translaltion 0.0  0.0  0.0
        children [
                shape {
                        appearance Appearance {
                                material Material {
                                        diffuseColor 0.023529  0.52549  0.023529       ⎫
                                        specularColor .9  .9  .9                       ⎬ 1900
                                }                                                      ⎭
                        }
                        geometry IndexedFaceSet {
                                ccw TRUE
                                coord Coordinate ( point [
                                        -1.5  -1.5  0,
                                         1.5  -1.5  0,
                                        -1.5   1.5  0,
                                         1.5   1.5  0,      ⎬ 1902
                                        -1.5  -1.5  3,
                                         1.5  -1.5  3,
                                        -1.5   1.5  3,
                                         1.5   1.5  3]
                                }
                                normal Normal { vector [
                                         1  0  0,
                                        -1  0  0,
                                         0  0  1,
                                         0 -1  0,
                                         0  0 -1,
                                         0  1  0,
                                ] }
                                normalPerVertex TRUE
                                coordIndex [
                                        0, 2, 3, -1,
                                        3, 1, 0, -1,
                                        4, 5, 7, -1,
                                        7, 6, 4, -1,
                                        0, 1, 5, -1,
                                        5, 4, 0, -1,   ⎬ 1904
                                        1, 3, 7, -1,
                                        7, 5, 1, -1,
                                        3, 2, 6, -1,
                                        6, 7, 3, -1,
                                        2, 0, 4, -1,
                                        4, 6, 2, -1,]
```

FIG. 19A

```
                                normalIndex [
                                        4, 4, 4, -1,
                                        4, 4, 4, -1,
                                        2, 2, 2, -1,
                                        2, 2, 2, -1,
                                        3, 3, 3, -1,
                                        3, 3, 3, -1,
                                        0, 0, 0, -1,
                                        0, 0, 0, -1,
                                        5, 5, 5, -1,
                                        5, 5, 5, -1,
                                        1, 1, 1, -1,
                                        1, 1, 1, -1,
                                ]
                        }
                }
        ]
}
```

FIG. 19 CONTINUED

Model Attributes
- Requires transparency
- Format
- Num Polygons
- Texture mapped
- Language
- etc.
FIG. 22
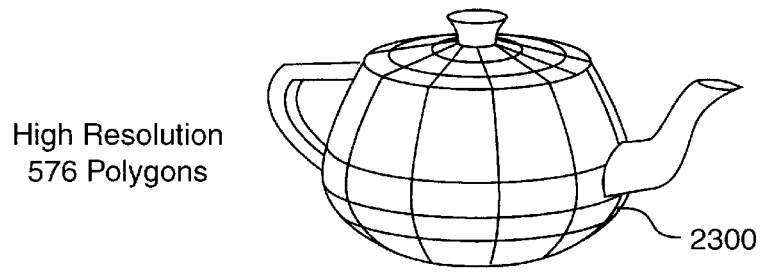
High Resolution
576 Polygons
FIG. 23A
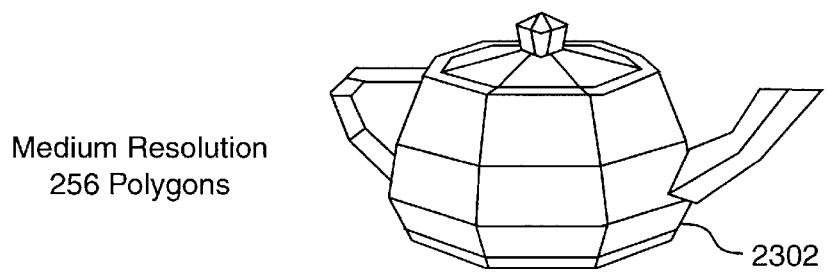
Medium Resolution
256 Polygons
FIG. 23B
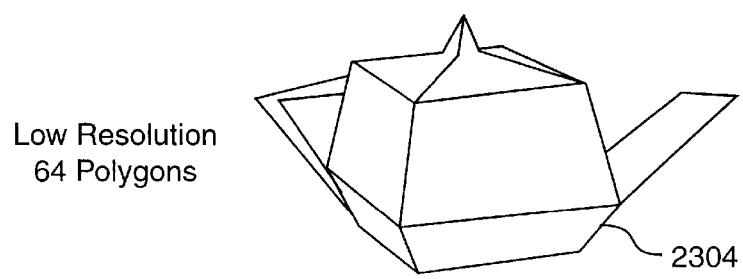
Low Resolution
64 Polygons
FIG. 23C

High End Platform

SGI Infinite Reality
Silicon Graphics,
Mountain View, CA.
10-80 million polys per second
16+ Megabytes texture memory

Attributes:

High polygon count
High resolution textures
PNG or RGB 24 bit format

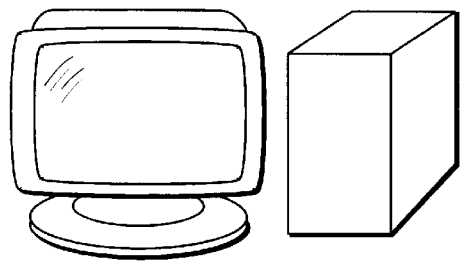

Mid-range Platform

PC with graphics accelerator 100,000 - 1 million polys/sec
1 Megabyte texture memory

Attributes:

Medium polygon count
Medium resolution textures
GIF 8 bit format

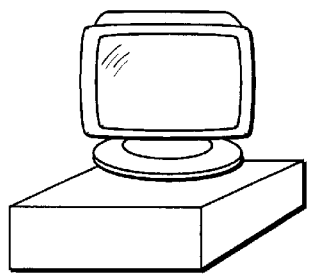

Low End Platform

Nintendo64
Nintendo, Redmond, WA 40-100,000 polys per second
0.5 Megabyte texture memory

Attributes:

Low polygon count
Low resolution textures
24 bit format

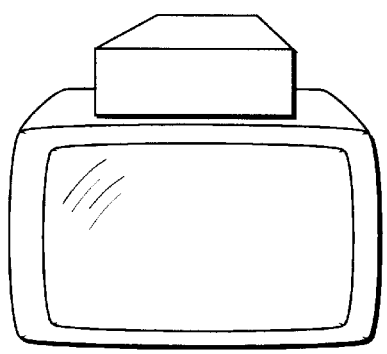

FIG. 24

3D VIRTUAL ENVIRONMENT CREATION MANAGEMENT AND DELIVERY SYSTEM

FIELD OF THE INVENTION

The present invention relates to the field of providing virtual reality and other highly graphical environments and more particularly to a system for creating, managing and delivering real time 3D virtual reality environments on a network.

BACKGROUND OF THE INVENTION

It will be appreciated that in the field of creating, managing and delivering 3D virtual reality environments there is a requirement for the storage of these environments, presently in files. When one wishes to work on a section of the virtual reality environment, or when one wishes to transmit a different version of the virtual reality environment, or, in short, when one wants to do any manipulation or delivery of the environment, it usually requires the storing, transmission and downloading of a large file.

There are various issues regarding such manipulation, creation and delivery of a 3D virtual reality file when one seeks to do these operations in real time on the Internet. The problem areas involve such things as persistence, scalability, security, multi-edit capability, multi-resolution problems, multi-format requirements and version control.

Taking persistence, persistence refers to the ability to maintain a change in the 3D virtual environment once a change has been made. Note that changes can be saved if one rewrites the entire file. This is so prohibitive that most systems do not allow permanent changes made in a browser-only in authoring tools. For instance, taking a VMRL file, it is oftentimes desirable to be able to change only a portion of the file without loading and saving the entire file. It will be appreciated that VMRL refers to Virtual Reality Modeling Language, which is a file format for the content of the 3D virtual reality environment. Note that in order to change a single item in the file, one must read and then save the entire file. Typically, a VMRL file may be as large as 10 megabytes, thus making it difficult to make even small changes.

With respect to scalability involving the increasing of the size of the 3D virtual environment, it is only with difficulty that prior art file systems can be provided with such capability. This is because most of the information is stored in a single file, or at most, a few files. In order to scale up a virtual reality environment, the few files must be increased to ever and ever larger proportions, again providing an unwieldy and time consuming way of handling virtual reality files. In addition, even using the capability of VRML to separate the larger file into smaller files, this presents new problems concerning the management of many, many small files in the file system and presents many new opportunities for error or loss.

With respect to security, it will be appreciated that providing a security code for a single file gives access to the entire file to each one of the users who may be seeking to edit the file. There is therefore no present ability to provide access only to a small portion of the file which is in need of editing, while at the same time locking out the remainder of the file.

Moreover, it is only with great difficulty that one can divide up the file into that which is authorized to be seen and that which is not, thus to allow one individual to edit only a portion of the file.

As a result, the ability to have a multi-edit function in which users are allowed to edit the portions of the virtual reality environment in parallel is not possible given the current state of providing the virtual reality environment as a single file. Moreover, there is no capability with a single file system to provide multiple resolutions for the 3D virtual reality environment. The multiple resolutions are useful in being able to match the output file to the machine which is to receive it. For instance, certain high end machines have the ability to display a detailed texture of a graphical object, whereas others do not. Moreover, the ability to draw polygons, one of the prime elements in 3D graphical rendering, varies from machine to machine. There is no way currently to be able to provide a file having a single content with differing resolutions since the entire file must be altered for the particular resolution required. Likewise, when using a single file to record the 3D virtual environment there is no ability to provide the same content on multiple platforms, e.g. no crossplatform capability. The single file approach to the storage of virtual reality environments precludes multiple formats in which the same content can be provided in differing formats.

Finally, with the utilization of a single file for the virtual reality environment, there is no possibility of version control without complete duplication of the original file. Thus, for instance, if there is to be a few byte change in a 10 megabyte file, in order to change the version, one might be left with two 10 megabyte files.

In summary, the above problems in the creation, management and delivery of 3D virtual environments denies present systems the ability to handle multiple authors on multiple platforms. There is therefore a need for a system to deliver content to diverse hardware machines having differing capabilities. Moreover, it is important to make sure that only invited guests have access to the content, while at the same time being able to allow the virtual environment to grow without bounds.

Finally, how one can make the 3D environments persistent and modifiable over time allowing authors to take and release control over the object in the environment at will is a perplexing problem, when realizing that the virtual environment is stored on a single file.

SUMMARY OF THE INVENTION

A system for the creation, modification and delivery of a virtual environment is one in which the virtual reality environment or scene is stored not in terms of files, but rather in a database format in which the virtual reality environment is divided and stored as different records in the database. This allows multiple authors to work in different parts of the 3D environment, allows selected access to different parts of the 3D environment by different persons, allows version control, provides the ability to save changes, e.g. persistence, provides scalability, security and format control and independence, all by being able to work on separate parts of the virtual reality environment without disturbing other parts. The use of the database permits indexing that provides quick access to various parts of the environment.

For instance, individual records or objects to be updated without affecting other records in the database present advantages over prior art systems. Here the virtual environment is stored as a file, in that changes to different records can be made simultaneously, for example by two or more different creators, without affecting or writing over changes just made and allowing only these records which are changed to be updated. This significantly reduces the required amount of network communication.

The use of the database permits solving problems of persistence, scalability, multi-edit capability, multi-resolution, multi-format and version control since various parts of the database can be queried, altered and outputted without regard to other parts.

It will be noted that persistence requires a nonvolatile, permanent storage, excluding RAM storage which is volatile, but including high density disk storage, which is both fast and nonvolatile.

It is also important to allow access and locking in a fine-grained manner to promote use by multiple users. However, if the locking granularity is too large, e.g. not fine enough partitions, one author can lock up a large section of the 3D environment, while only modifying a small part of that environment.

Storing the 3D environment in the database provides persistence equivalent to files on a hard disk. Indeed, the use of a database provides access to just the part of the 3D environment needed, which permits modification much faster than utilizing and downloading the complete file. The database also allows multiple authors working at the same time with concurrent access and row or object locking.

In order to accomplish this, the database is partitioned such that the entire 3D environment is divided into smaller, related manageable chunks. In one embodiment, a "locales" approach is a convenient choice because it also provides good flexibility and scalability.

Thus, in the subject invention, a virtual reality environment creation, modification and delivery system stores information representing the virtual reality environment in a database where portions of it may be created, modified or delivered without affecting other portions. The database may be accessed, for example, over a network such as a wide area network, to allow database records to be individually updated without affecting other records in the database. In this manner, it is not necessary to read and store an entire virtual reality environment file in order to make changes to it. In addition, characteristics of target machines dictate what version the database reads out, thus to provide a version compatible with the target machine. Moreover, certain aspects of the virtual reality environment such as texture may be stored in various forms to accommodate the characteristics of several target machines. For example, textures for features of the virtual reality environment may be stored in a "high resolution, 24 bit format" for target machines with a large amount of texture memory, in a "low resolution and low bit depth format" for target machines with some lesser amount of texture memory and in a non-textured format for target machines without texture memory.

BRIEF DESCRIPTION OF THE DRAWINGS

These and other features of the Subject Invention will be better understood taken in conjunction with the Detailed Description in conjunction with the Drawings of which:

FIG. 7A is a diagrammatic representation of a virtual environment scene which includes a landscape, a cloud, a tree, a road, a path and a house;

FIG. 7B is a listing from a computer file system showing one possible way to store the information of the virtual environment in files;

FIG. 7C is a listing from a computer file system showing another possible method of storing the virtual environment information where all the information is contained in a single file;

FIG. 9 is an abbreviated computer printout showing one possible way of representing the scene in FIG. 8 using the Virtual Reality Modeling Language file format;

FIG. 10 is an abbreviated computer printout showing the data for the table top with other elements left out for the Table shown in FIG. 8;

FIGS. 13 and 14 are a set of tables illustrating example data stored in the database of FIG. 12, with the data corresponding to the scene in FIG. 8;

FIGS. 16–18 are a set of tables illustrating example data stored in the database of FIG. 12, with the data corresponding to the scene in FIG. 8;

FIG. 19 is an example data file for a single primitive in the database, with the primitives table being shown in FIGS. 15 and 17;

FIG. 22 is a diagrammatic illustration showing which attributes apply to models stored in the 3-D database;

FIG. 23 is a diagrammatic illustration showing three different resolutions of the same teapot model;

FIG. 24 is a diagrammatic illustration indicating some of the important characteristics of different hardware platforms on which 3-D information can be displayed;

DETAILED DESCRIPTION

Figure 1A:
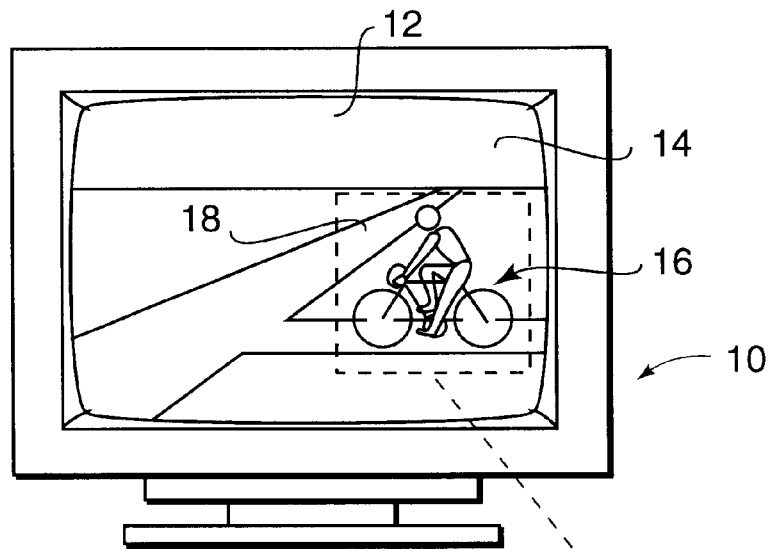
FIGS. 1A and 1B are diagrammatic representations showing selection of a portion of a virtual environment for alteration.

As an overview, virtual reality environments are becoming increasingly used. One application for such environments is in computer games. However, many other applications are being developed. For example, a virtual reality environment may be created to allow training of professionals in certain fields such as medicine, for example, an environment which allows training of a surgeon. In addition, virtual reality environments are being created to allow social interaction by allowing multiple individuals to access the environment over a network and to interact with others in the environment.

Virtual reality environments use a number of resources of the target computer system on which they are designed to execute. For example, the virtual reality environment will utilize the graphics and sound capabilities of the target computer system.

Capabilities of computers vary greatly. For example, some high-end computer systems may be capable of displaying very detailed textured graphics. For example, a high end graphics work station may contain 64 MB of texture memory, which memory is used to significantly enhance the realism of the displayed virtual environment. Other target machines may not have any texturing memory. Some target computer systems may be capable of displaying 3-D graphics, while others may be limited to 2-D graphics. Some high-end computer systems may be capable of producing very high-fidelity sounds, while other lower-end devices may produce relatively lower fidelity sounds. Still further, in a networked environment, the network connection of computer systems will operate at varying speeds. The virtual reality environment may depend on the network capabilities of the target machine, such as, for example, where multiple individuals are playing a networked game or even where the virtual reality environment is actually stored on a remote computer and transmitted over the network to the target computer.

In a prior art method of distributing virtual reality environment content to various target computers, the content for each target machine is distributed as separate files such as the content for a high end workstation as one file, the content for a midrange workstation as a second file, the content for a personal computer as a third file, the content for a network computer as a fourth file and the content for a set top box as a fifth file.

A prior art process for developing the content for each of these target computers is arranged such that the content for each target computer is developed separately and is stored as a separate large file. In a situation where someone only needs access to a portion of the virtual environment, they are still required to download the entire file. There is therefore a necessity to be able to read 3-D virtual environments and store them in other than a complete file so that only portions need to be downloaded. Also, virtual environments targeted to different machines or platforms have a similar internal structure which must be maintained for all machines. Maintaining multiple files to retain the same internal structure is difficult and time consuming.

Moreover, at least two additional issues exist when it is necessary to change a part of the content. First, a change made to the content for a high end workstation will not affect the content for a low end workstation such as a set top box. The change must be made separately for each file. Second, even a small change in the content requires saving the entire content again in a file. Virtual reality environments can be, and usually are, large files. The simple act of saving the file can be time consuming, in itself discouraging changes to the virtual reality environment.

As will be appreciated, to change even a portion of the virtual reality environment generally requires accessing the entire file, at least because the entire file must be saved again to complete the change. Situations can be easily imagined where this is a cumbersome operation. For example, taking a virtual reality environment at a client's network in Detroit, Mich., after the creator has successfully installed the environment on the network in Michigan and is working from home in California, a request is made by the client to change an aspect of the virtual reality environment. Even if the creator has a copy of the virtual reality file on a local computer system, after making the requested change, the entire file must be transferred to the client's network. Given the typically large size of virtual reality environment files, the time to transmit the file to the client's network may be very long, if not prohibitive. A system to be able to work on only a small portion of a 3-D virtual reality file is thus a necessity.

Still further, when creating a virtual reality environment, the creator typically develops the environment on a development machine. The development machine typically is a relatively high end machine. Thus, the environment will be displayed using the capabilities of the high end machine and will typically need to be separately tested on a low end target machine. This process may lead to repetitive development, testing and redevelopment. What is necessary is a system to be able to create content in a number of versions so that the same content can play on machines having different capabilities.

What is therefore needed is a virtual reality development and execution environment which overcomes these and other issues.

More particularly, the problems that need to be solved are how one designs a 3D environment with multiple authors on various platforms. One also has to be able to deliver content to diverse hardware having differing capabilities. It is also important to be able to make sure that only invited guests have access to the content and only invited authors are allowed to modify the 3D environment. Moreover, it is important as to how one allows the virtual environments to grow without bounds when there are hard limits, for instance, as to how many polygons that can be drawn per second. One also needs to make the 3D environments persistent and modifiable over time, allowing authors to take and release control over objects in the environment at will.

Thus, because of the problems of the ability to quickly adapt, create, manage and distribute 3D environments, it is important to be able to bring persistence, scalability, security, multi-edit capability, multi-format for crossplatform performance capability, multi-resolution and version control to realtime 3D virtual environments on the Internet.

Figure 1B:
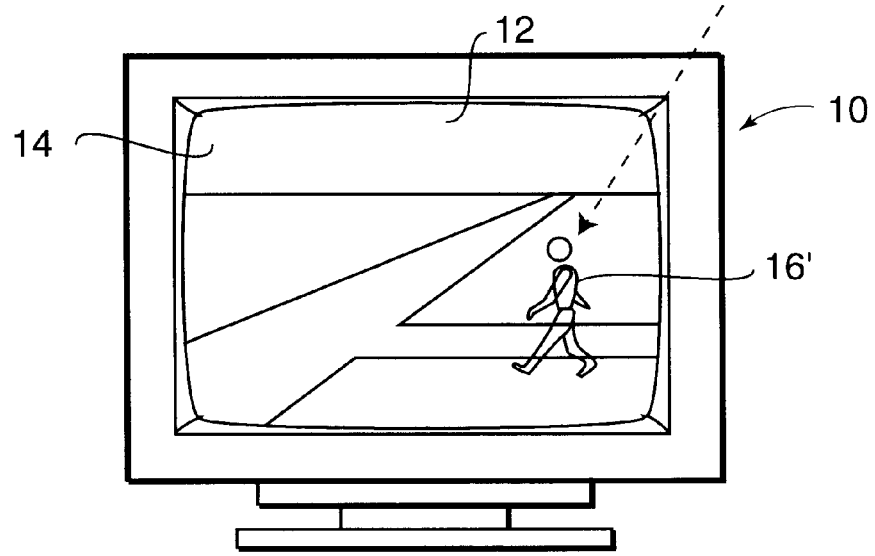

Referring now to FIGS. 1(a) and 1(b), as can be seen a terminal 10 carries a virtual reality scene 12 on a display 14. In general, it may be desirable to edit the virtual reality scene such that a graphical object 16 generally within a region shown by dotted box 18 is to be edited. When it is desirable to edit such a portion of the virtual reality scene, as will be described hereinafter, that portion of a relational database carrying the particular locale in which the graphical object lies is accessed such that the graphical object 16 can be altered, in this case to remove the bicycle and to provide a standing individual such that the graphic object now appears as graphical object 16'.

Figure 2:
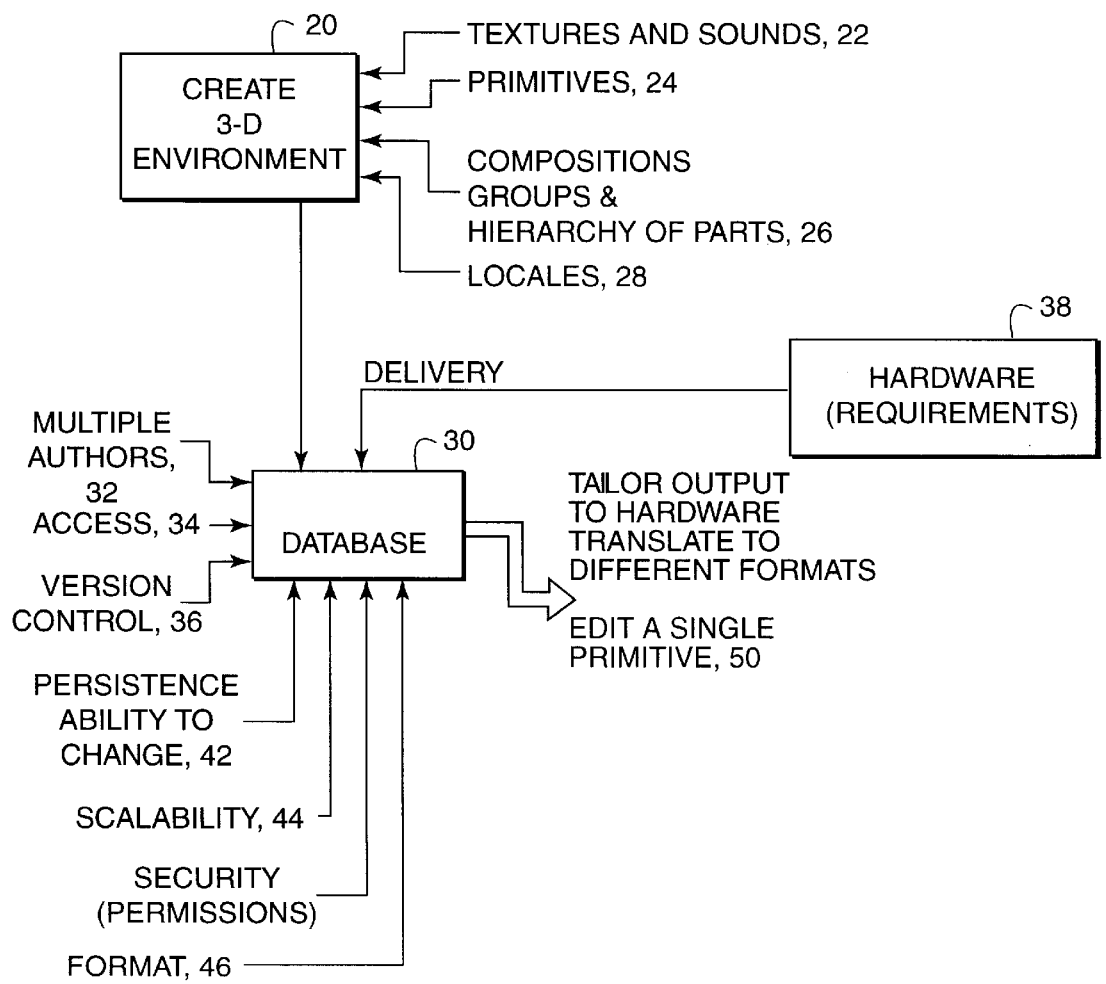
FIG. 2 is a block diagram showing the use of a database for storage of virtual environments.

Referring now to FIG. 2, it will be appreciated that in order for the ability to edit a 3D environment, the environment is first created as illustrated at 20 with inputs such as textures and sounds 22, primitives 24, compositions including groups and hierarchy of parts 26 and, in general, locales 28 which divide up the virtual reality scene into various chunks or regions.

The creation of the 3D environment is downloaded to a granular database 30, which is utilized in the storage of the 3D environment and to permit editing, changing or deleting various portions of the 3D environment without having to present and/or store a single file containing the virtual reality environment.

What this permits is multiple authors 32 to be able to work on different portions of the virtual reality environment. Moreover, access to various portions of the virtual reality environment can be restricted as illustrated at 34. Moreover, what version of the particular virtual environment is controlled at 36 and depends in part on hardware requirements 38 presented by the client in a client server system.

Persistence is guaranteed through the ability to change various portions of the virtual environment without effecting others as illustrated at 42, whereas scalability as illustrated at 44 is provided through manipulation of the granular database.

Finally, format 46 can be specified for the output of the granular database to be able to format or tailor the output to the particular hardware involved, to translate from different formats or to edit a single primitive as illustrated at 50.

It will be appreciated that the word "granular" refers to dividing up the virtual environment into different parts and to be able to work on the different parts separately.

Figure 3:
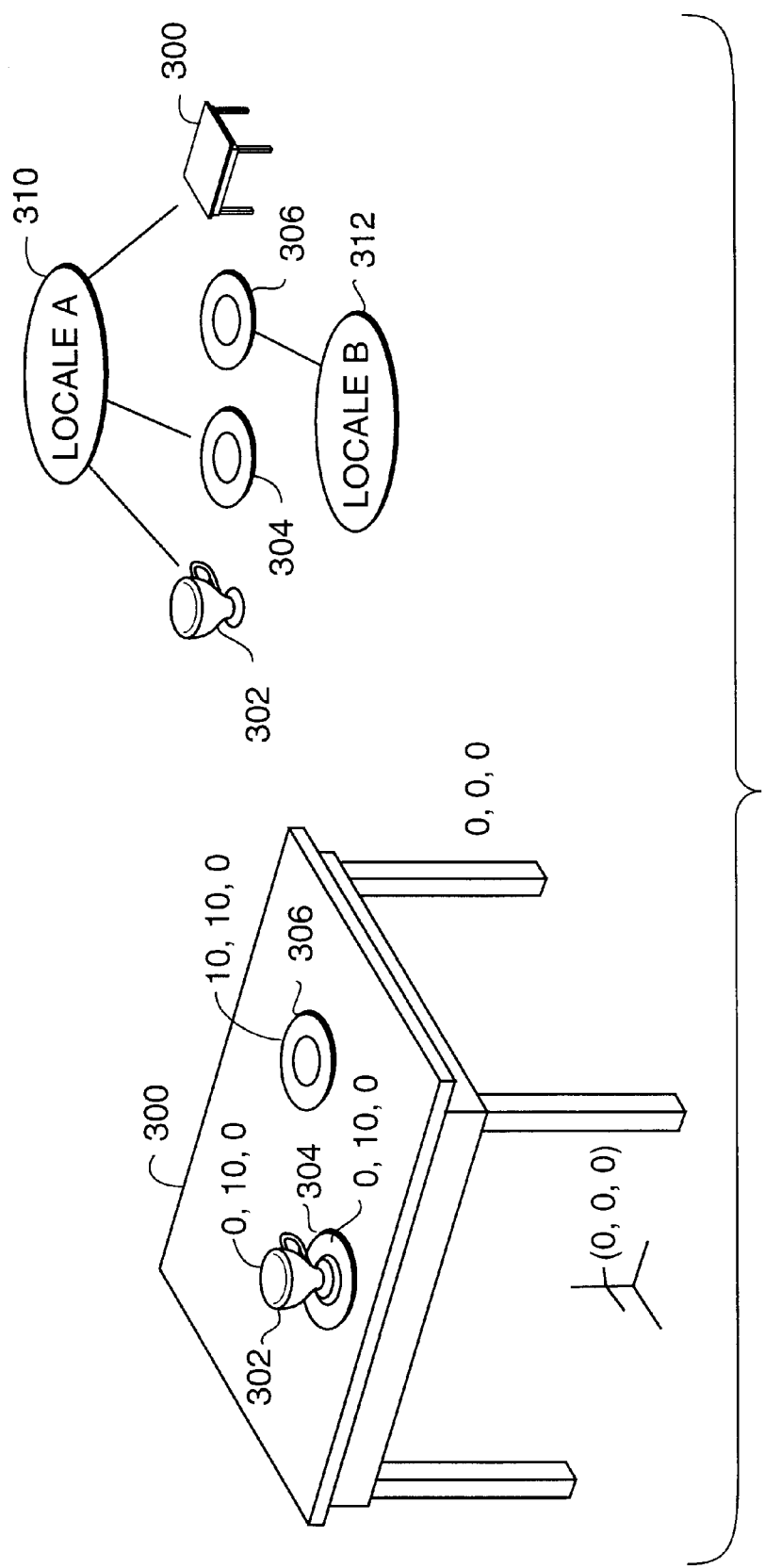
FIG. 3 is a diagrammatic representation of a virtual reality screen illustrating that various graphical objects may be treated separately in separate locales.

As an illustrative example and referring now to FIG. 3, a virtual reality scene may include, for instance, a table 300, a cup 302, a saucer 304 and another saucer 306. As can be seen, these elements are located within the virtual reality scene based on an origin (0, 0, 0). It will be appreciated that if the entire virtual reality scene is stored in a single file that varying the individual items 300–306, one would necessarily have to download the entire file. However, by dividing up the virtual reality scene into locales as can be seen by Locale A, here bearing reference character 310, to include cup 302, saucer 304 and table 300, leaving to Locale B, here illustrated by reference character 312, to include saucer 306 as illustrated in the relational database table 320 it is possible to pull out saucer 306 by virtue of its locale and to edit it separately from all of the other graphical objects in the virtual reality scene. As can be seen by file 400, Locale A includes the table and the saucer, etc., whereas Locale B includes the saucer at position 10, 10, 0. Thus, it can be seen that by using a relational database of a particularly fine granularity, one can edit ever decreasing sized portions of a virtual reality scene.

Figure 4:
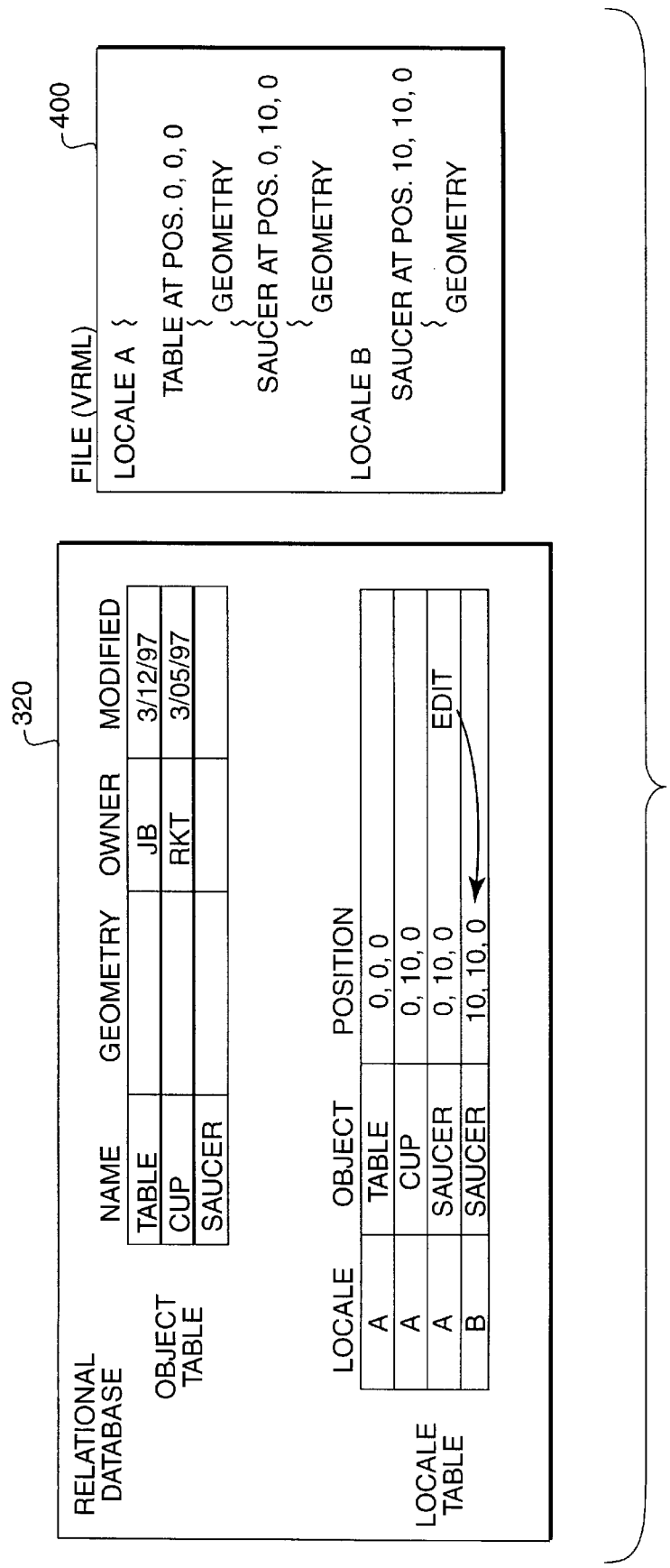
FIG. 4 is a table illustrating the storage of graphical objects in a locale at different places in a relational places database, also showing a corresponding VRML file for accessing different locales.

Referring now to FIG. 4, the VMRL file through which the database can be accessed makes clear that various portions of the database can be altered so as to alter the corresponding portion of the virtual reality environment.

Figure 5A:
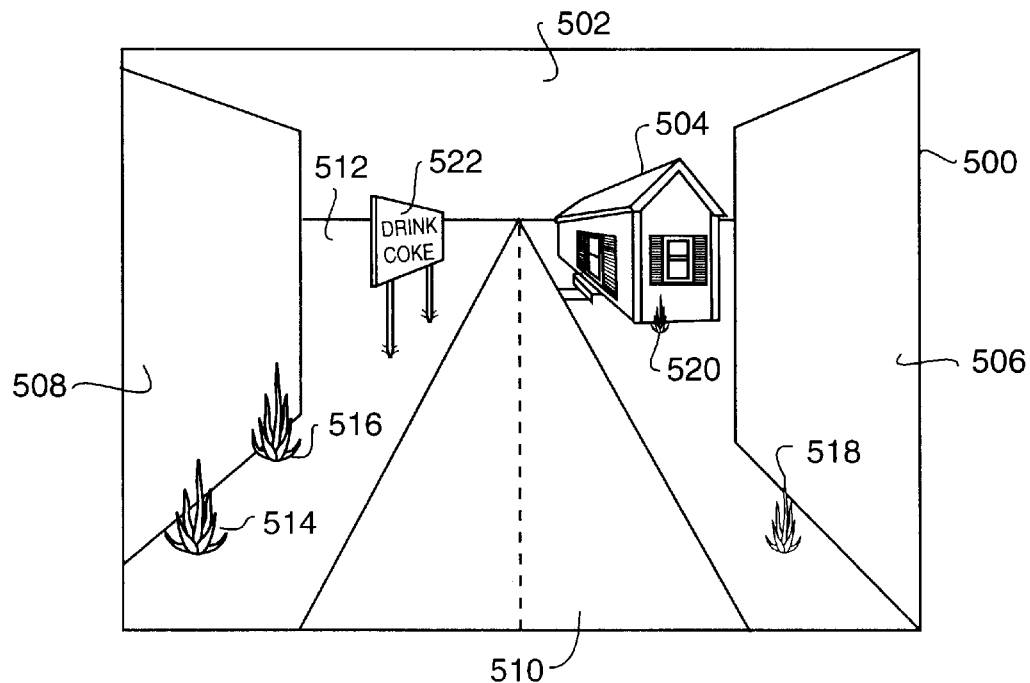
FIGS. 5A and 5B are diagrammatic representations of a virtual reality scene showing one part of a large virtual environment containing a landscape, two buildings, a house and an advertising billboard.

More particularly, and referring now to FIG. 5A, an image 500 represents a scene drawn on a screen of a virtual environment 502. This virtual environment contains a house 504, two buildings 506 and 508, a road 510, a landscape 512 and some grass 514, 516, 518 and 520. The advertising billboard 522 displays an image called a "texture map" which is frequently used in virtual environments to increase the realism of the environment without increasing the number of polygons which must be drawn by the 3-D rendering hardware. Also present and audible, but not visible in the scene are the sounds of birds singing and wind blowing past the buildings, house and billboard.

Each model, like the house 504, shown in FIG. 5A, is made of a list of polygons. Each polygon has specific colors assigned to it either on a per face or per vertex basis. In addition, each polygon might have a "texture map" associated with it so that instead of a polygon taking on a constant or smoothly varying color, it can display an image as if the image were painted on the polygon as a detail.

Texture maps are important for 3-D virtual environments because each 3-D graphics generator hardware has a limited capacity for drawing polygons on the screen. Where a fully detailed house might require millions of polygons to draw realistically on the screen, it is possible using textures to replace an entire side of that house with a single rectangular polygon which has an image which looks like the detailed side of the house. This means that a 3-D graphics hardware which can only draw 10,000 polygons per second might still be able to draw several houses per frame at a respectable 10 or 15 frames per second and those houses will be recognizable as houses.

Not all 3-D graphics hardware has the capability to use texture maps when displaying 3-D graphics, but that situation is becoming increasingly rare because of the importance of adding detail to scenes with texture maps.

Even though most 3-D hardware today supports texture mapping, not all of that hardware treats textures the same. Some hardware supports transparent texture like glass or plastic. Some hardware requires text images to be square or a certain size, like 128 pixels by 128 pixels. Some hardware can handle only 1 megabyte of texture images, while other hardware can support 64 megabytes of texture images, allowing the drawing of much richer 3-D environments.

In the case where limited texture memory is available, a large virtual environment with 4 megabytes of texture might still be able to be displayed if the textures were smaller. In other words, by reducing all of the textures by half in each direction, the total memory used by the textures would only be 1 megabyte and would be displayed on a 1 megabyte texture machine.

Texture maps are shown in FIG. 5A on billboard 522 and also on the side of house 504 where a texture map has been used to represent the windows of the house. An additional texture is shown on road 510 to display the traffic stripe.

Although the grass 514, 516, 518 and 520 could be displayed as a set of polygons in the shape of the grass blades, typically, the grass would be a single rectangular polygon with a partially transparent image on it. The part of the image that is not transparent would be colored green in the shape of growing grass.

Figure 5B:
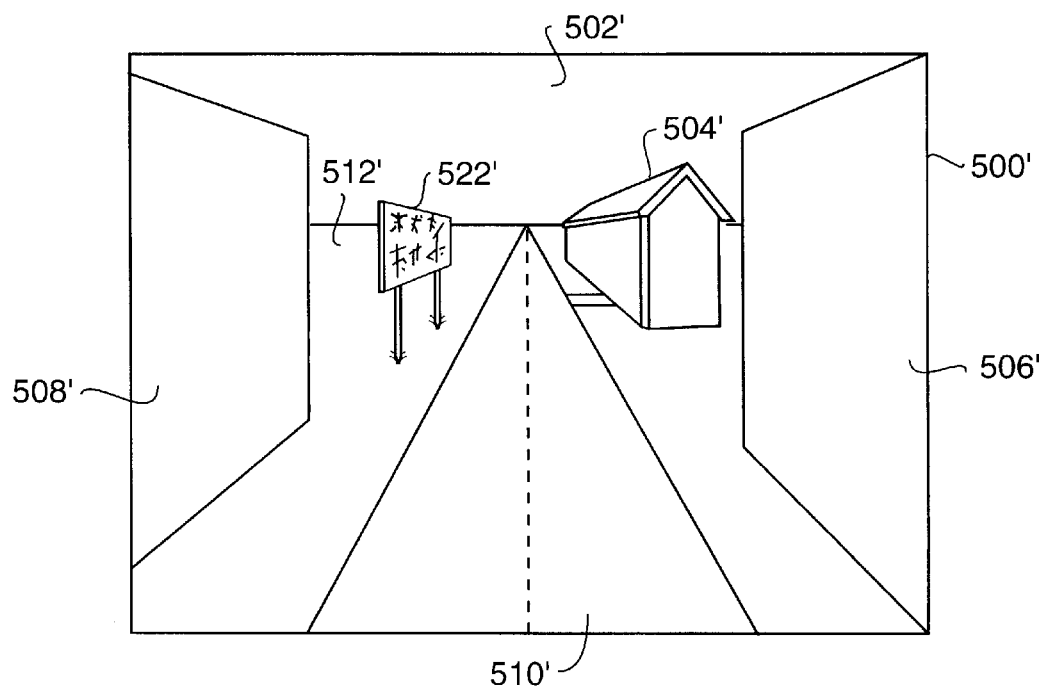

Referring now to FIG. 5B, it can be seen that the advertising billboard 522' still shows a texture map, but the image contains non-English lettering. In this case, image 500' showing a view into the virtual environment has been drawn for a non-English speaker and instead of using the original English version of the billboard texture, a texture drawn in the native tongue of the viewer has been substituted. It will be appreciated that there are many ways of ascertaining the language spoken by the viewer, including asking the viewer directly. Once the language has been ascertained, it is possible to substitute the correct image for the billboard texture map assuming a texture with that language has been created.

It will also be appreciated that this same substitution technique could be used to put targeted advertising messages onto the billboard depending on the identity and specified interests of the person viewing the virtual environment.

There is no convenient method of making this type of substitution in currently available systems. As has been described, most systems use a single large file to represent the virtual environment. Any change to that file requires reading in the entire file, making a small or large change and then saving that file again to the file system. If this is a large file, the process of reading, modifying, and then saving can take minutes and is impractical.

It can also be seen that even as the structure of the virtual environment stays the same for all the above examples, the details of what is in that environment may change depending on the hardware used to render that scene and the viewer of the scene. Again, looking at FIGS. 5A and 5B, it will be appreciated that grass 514, 516, 518 and 520 is not visible in image 500', perhaps because the hardware rendering image 500' does not have the capability of displaying partially transparent textures. House 504' is not as detailed perhaps because the hardware rendering image 500' is not capable of drawing as many polygons per second as the hardware which rendered image 500.

In addition, not only might the billboard 522' be displaying a different image than billboard 522, but that image might be at a completely different resolution and might be stored in a different format than the image used for billboard 522.

Figure 6C:
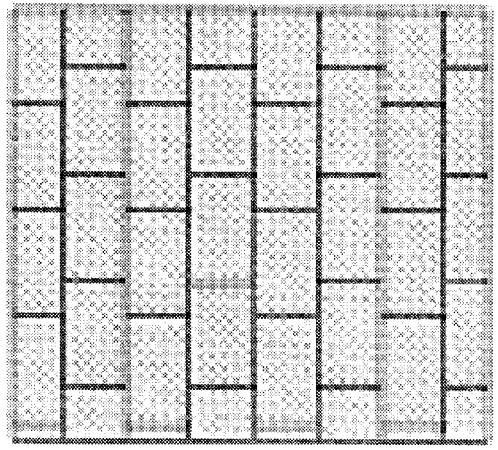
FIGS. 6A, 6B and 6C are diagrammatic representations showing two different image files which represent the same image in a high resolution and high bit depth format, medium resolution and medium bit depth format, and a low resolution and low bit depth format, respectively.
Figure 6B:
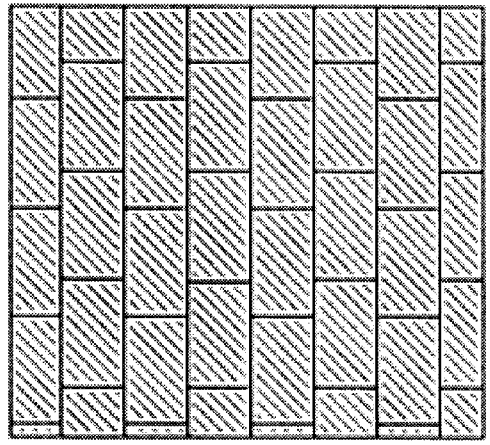
Figure 6A:
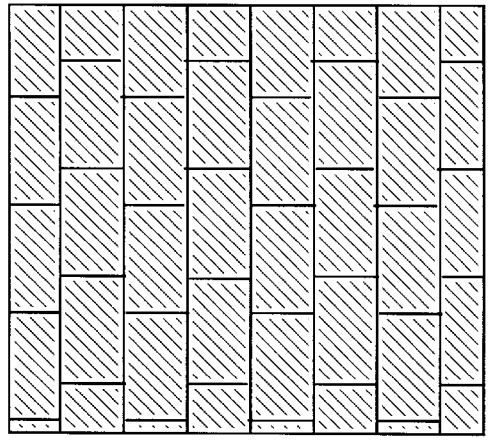

Referring now to FIGS. 6A, 6B, and 6C respectively, these figures show a texture map like those used for building a brick wall in a virtual environment.

FIG. 6A has a high resolution brick image stored at a resolution of 1024 pixels by 1024 pixels. Also, it is stored using 24 bits per pixel to represent the color information in the image. 24 bits per pixel which allows the representation of more than 16 million colors individually within the image and almost always gives a better picture than one with fewer bits per pixel. The colors of the pixels must be stored in a specific way on non-volatile storage like a hard disk in order for a program to be able to use them. Typical storage formats are called PNG, TIFF or JPEG for Portable Network Graphics, Tagged Image File Format and Joint Photographic Experts Group respectively. There are also other formats called TARGA, GIF, PIC, etc and each of these refer to a specific way of storing pixel information for later use.

Each of these formats has different capabilities. For instance, the GIF format allows lossless compression of the image data, but can only store up to 256 colors at 8 bits per pixel. Photographs stored using the GIF format are noticeably degraded. However, they take up much less space on the disk than 24 bit images.

FIG. 6A shows a 1024×1024 pixel or 1,048,576 pixels images stored using the TIFF format at 24 bits per pixel. Such an image would consume 1,720 kilobytes on a disk for the image information and the additional data describing the image. Most images can be compressed and the PNG, TIFF, JPEG, GIF and other formats allow for either lossy or lossless compression.

FIG. 6B shows a 128×128 pixel image or 16384 pixels image stored using GIF format at 8 bits per pixel or 256 colors. This image would consume about 8 kilobytes on disk, including additional data about the image and the color map.

FIG. 6C shows an even lower resolution image at 32×32 pixels stored using the GIF format. This image consumes only about 2 kilobytes of disk space, but is clearly inferior to the other images.

Any of these images could be used as texture maps in a virtual environment if the software and hardware rendering the virtual environment scene knows how to read and interpret those image formats. Unfortunately, certain rendering software can only use specific formats and resolutions and there is no industry standard which is used by all rendering software. For instance, high-end SGI software likes texture maps whose X and Y resolutions are powers of 2. Some PC-based renderers like only square textures at a resolution of 128×128 pixels. Some renderers read GIF, PNG and JPG files while others will also read a special SGI format called RGB. Others will only use PNG and JPG and others only the GIF format. Because of these differences, it is difficult to create a single virtual environment that will run across various platforms.

Consider also that in situations where the virtual environment is being viewed remotely over a network connection, a scene containing several megabytes of texture maps will take a long time to download. For instance, the uncompressed image in FIG. 6A will take almost 10 minutes to transmit over a 28.8 kbps modem which is the current industry standard. The image in FIG. 6B will only take about 3 seconds. Assuming that the virtual environment only contains 30 images, if they were downloaded at 28.8 kbps, this would take one and a half minutes to download all of the medium-resolution images or almost five hours for the high-resolution images.

If this virtual reality environment were to be developed for a CD-ROM based computer instead of over the Web and the hardware had the ability to show 30 1.7 megabyte textures, the CD-ROM based virtual environment would look clearly superior to the environment shown on the modem-based PC.

It should be clear that there are advantages to being able to deliver different resolutions and formats of images in differing situations even when the overall structure of the virtual environment remains the same.

Referring to FIG. 7A, this figure shows a virtual environment scene containing a landscape 702, a house 704, a tree 706 and a cloud 708. FIG. 7B shows a listing of a possible file system containing the models and textures which represent landscape, house, tree and cloud.

In a typical virtual environment like the one shown in FIG. 7A, the content of the virtual environment, including landscape 702, house 704, tree 706 and cloud 708 are stored in either one large file as shown in FIG. 7C or in a few large files as shown in FIG. 7B. A file like LANDSCAPE.PLY 710 contains a list of polygons which consists of edges and vertices that are used to draw the surfaces shown in the rendered view of the virtual environment. It also contains a list of colors that indicate which color each polygon or vertex should be when it is rendered by the hardware. Additionally, a list of textures used by those polygons is contained in the file, although rarely are the textures themselves stored in the file with the list of polygons.

FIG. 7B contains a directory listing of all the files used in creating or rendering the view shown in FIG. 7A. The listing entitled "TEXTURES" 712 is actually a subdirectory containing all of the texture map files used in rendering the scene of FIG. 7A and might include at least images of grass, roofing materials, wood, clouds, trees, a nd pavement. As shown previously, each of these texture files might be between 16 kilobytes and 3 megabytes depending on the resolution and bit depth.

Alternatively, FIG. 7C shows another approach where all of the polygons and related information except for the texture maps are s to re d in a single large file called ALL.PLY 714. Using one large file is convenient in some cases for transmitting the data used for rendering the virtual environment because the designer or author of the virtual environment does not have to deal with as many files as in the case shown in 7B. However, making even a small change in the virtual environment would require reading in ALL-.PLY 714, making the change, for instance moving the tree a little to the left, and then saving the entire ALL.PLY file again. In this case, at most only 12 bytes out of the more than 4 megabyte file has changed and the apparent convenience of keeping only one polygon file around has been overcome by the inconvenience of reading and writing large files even when making small changes.

In addition, if it is necessary to save the earlier version of the virtual environment so as to track changes, it would be necessary to save a second copy of the entire file, wasting more than 4 megabytes of disk space for a single 12 byte change.

To take this example to the other extreme, assume that all elements of a virtual environment are saved in smaller files, one object per file, similar to the situation shown in FIG. 7B, but with a much more typical and complex virtual environment. As the number of files increase, it becomes increasingly difficult to name the files appropriately and to keep track of what object is stored in which file. Although the convenience of having one object per file saves time when making small changes, the inconvenience of managing a large group of files becomes insurmountable. Also, the only additional information available to the creator of the virtual environment through the file system is the size of the file and when it was created. Useful information like the spatial limits of the model stored in the file, which is oftentimes called the bounding box of the model, is not directly available and in order to find that information for a single file, the file would have to be read into memory and analyzed.

Referring back to the discussion of FIG. 6, if it is necessary to keep two versions of the models available for different situations, for instance, a high polygon count model for high-end rendering hardware and low polygon count model for low-end PC's, it becomes necessary to create a somewhat arbitrary naming scheme within the directory which contains all of the virtual environment fields or the entire directory structure must be duplicated and each high polygon count file must be replaced with its companion low polygon count file. In the case where only a few models have high and low polygon count counterparts, the extra disk space taken up by this approach can be staggering and prohibitive.

It will also be appreciated that managing these files and directories must either be done by hand or by a program. Managing the files by hand is time-consuming and is an error-prone process. However, managing the files by program requires the specialized skills of a programmer. It is very infrequent that a person with the skills required to build an interesting and beautiful virtual environment will also have the programming skills to write scripts to manage files and directories containing that virtual environment.

To reiterate, it is advantageous to have the objects shown in the virtual environment be accessible either individually or in a group. There are times when it is convenient to access the entire viewing environment at once, for instance, when viewing or transmitting the virtual environment, and there are times when it is convenient to be able to selectively access a single object in the virtual environment at a time, for instance, when making changes to the virtual environment. It should thus be clear that using the file system for managing virtual environment objects is inconvenient and difficult.

Figure 8:
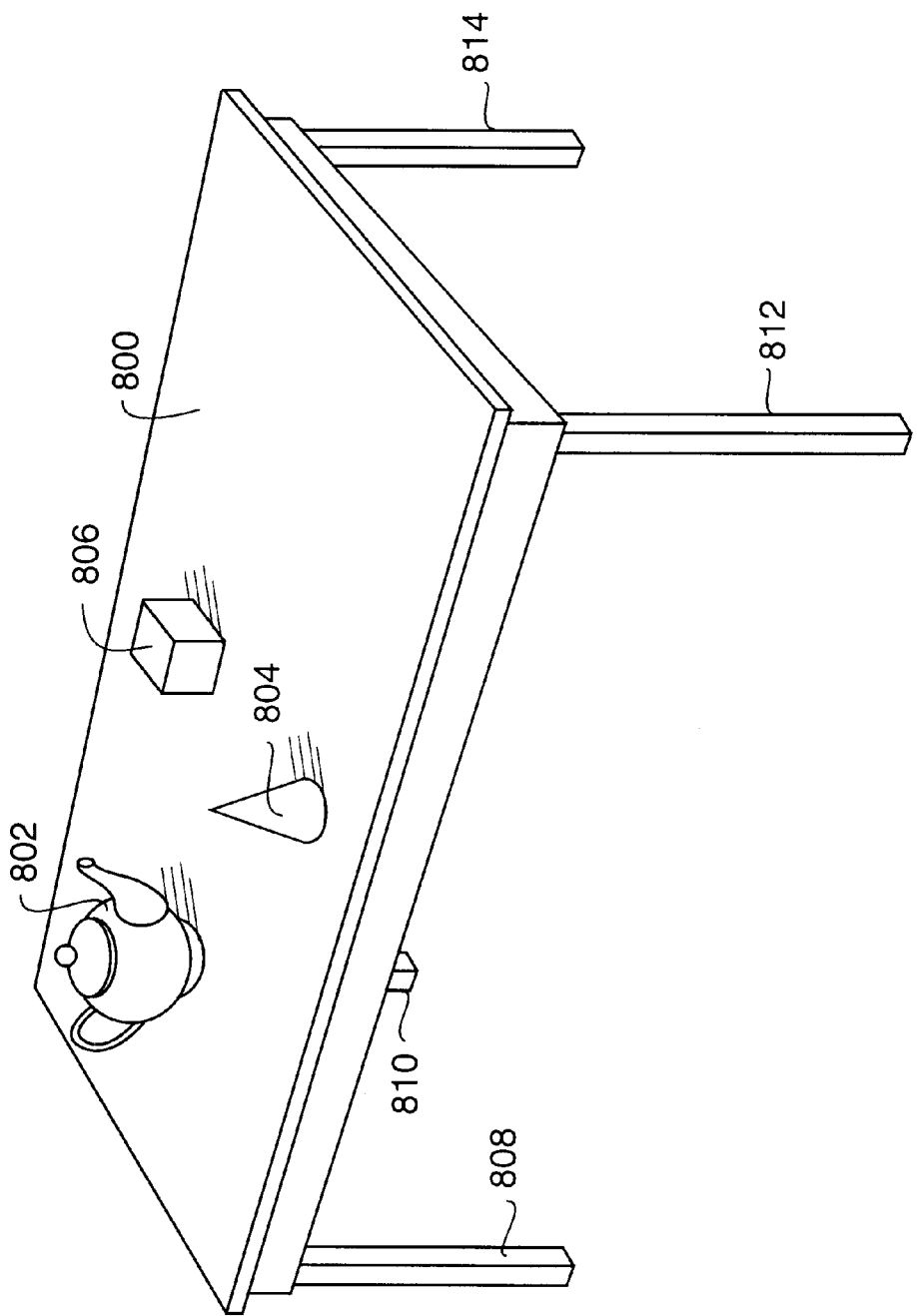
FIG. 8 is a diagrammatic representation of a virtual reality scene showing a table with a teapot, a cone and a cube resting on the table.

Referring now to FIG. 8, a table 800 is shown with a teapot 802, a cone 804 and a cube 806 supported by the table. The table has four legs 808, 810, 812, and 814 which are rigidly attached to the table. The purpose of this image is to show typical storage arrangements and requirements of virtual environments. This particular virtual environment is quite small, but is a good example. Notice that table 800 has the appearance of wood because it is "textured" with a texture map drawn to look like wood grain. The file that stores this texture map is in the JPEG format and uses 96 kilobytes of disk space. The file that contains a VRML format description of the scene, which is a readable description of the scene, is about 32 kilobytes in size. VRML stands for Virtual Reality Modeling Language and has been developed as a cross-platform language for describing virtual environments.

FIG. 9 is an abbreviated listing of the virtual environment scene shown in FIG. 8 in the VRML format. The data describing the vertices, colors and normals have been replaced with the words "--------DATA GOES HERE----------" in order to make this listing shorter. Notice that the table 800, teapot 802, cone 804, cube 806 and four legs 808, 810, 812, and 814 are all described in the file. Also, general information about the scene, including a description of the location and other attributes of a camera used to render the scene are included in the file.

Referring now to FIG. 10 which is a listing of the data defining the table 800, several lists of numbers give the location of vertices used in the polygons. Also, normals, texture coordinates and some indexes indicating which vertices are used in each polygon are shown and this additional information is used in creating a complete rendering of the table. A complete description of what each set of numbers means is not necessary here because someone skilled in the art of 3-D graphics and rendering will be familar with both the terminology and significance of each number or set of numbers. In addition, it is possible to read the VMRL 2.0 Reference to determine specifically what the entries in this file mean. The VRML 2.0 reference material is available through the VRML Consortium on the Internet.

Figure 11:
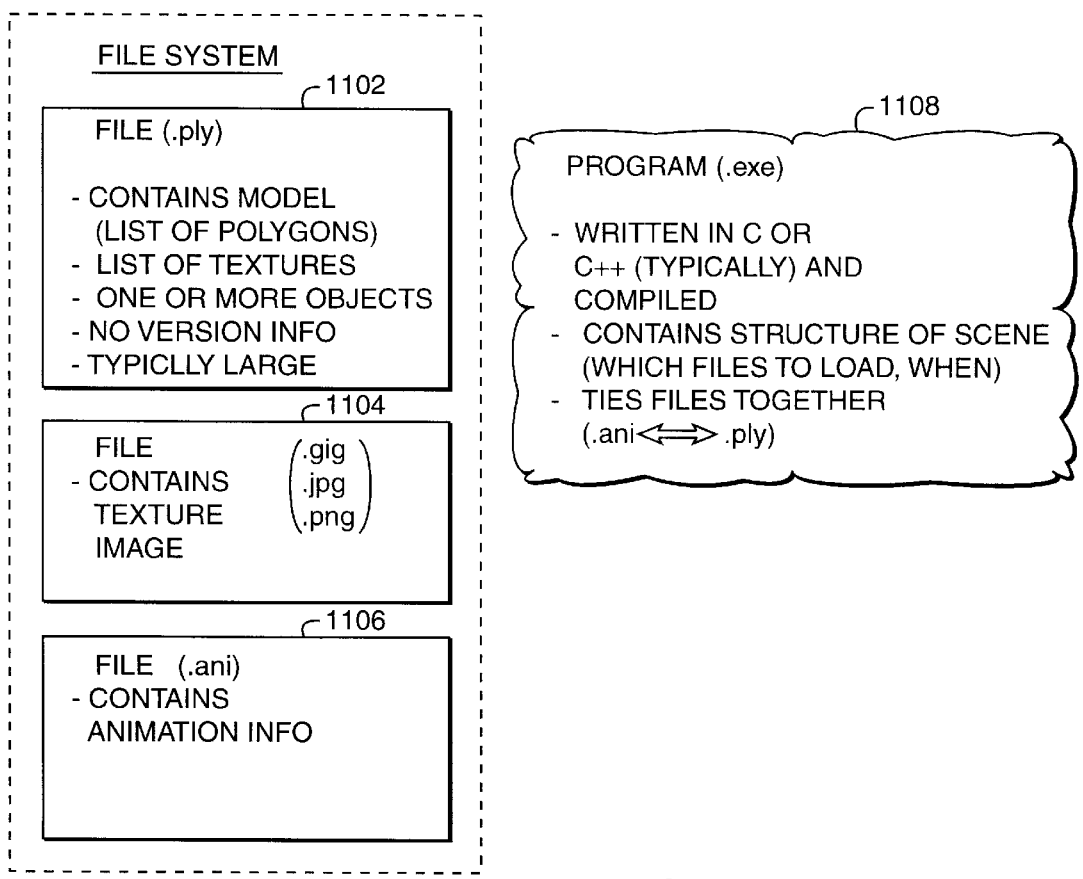
FIG. 11 is a diagram showing the different types of information required for a computer to display a virtual reality scene, also showing where that information is stored in a typical prior art situation.

Referring now to FIG. 11, the location of various bits of information necessary to construct a complete image of a single large virtual environment is shown. FIG. 11 shows a box 1102 which represents a model file which, for this example, will end in the file name extension.PLY. The file represented by box 1104 is an example image file whose extension might be one of many possibilities depending on the exact storage format of the image. Box 1106 represents a file containing animation information whose file name extension might be .ANI for this example. All of this information is used in some way in a virtual environment. However, the organization of that information, or how it is structured, when it appears and how it is used is typically stored in a program like the one represented by the cloud 1108. This program is typically written in C or C++ which is compiled into an executable for a specific machine type.

By way of example, imagine that an address book program was being developed. One approach would be to require a programmer to write into the C code the name and address of everyone who is to appear in the address book program. If it became necessary to add or delete a name, the programmer would have to re-open the source file, type in or delete the name and address, and then recompile the program once more. This is a very rigid approach to developing an address book, but is very similar to what is being done in virtual environments right now. A useful address book program would be built using a database which contained a specific set of fields or places to put several rows or sets of information. When a database is used, it is almost trivial to add and delete names from the database making changes much simpler.

In the subject invention, a similar approach for building virtual environments is described. A database structure has been developed which leaves places for defining the structure and contents of the virtual environment. By filling in the rows or sets of information in the database, a virtual environment can be completely defined and both the models 1102, texture maps 1104, animation information 1106 and structure 1108 can be stored in one place. Changing the data will change how the virtual environment appears on the screen of the computer without any recompiling.

As will be seen hereinafter, no longer does the virtual environment need to be stored in a single file or in several large files or in an unmanagable number of small files. The file system is not the best place for storing the virtual environment information, but it has been used because it was freely available on every computer and could be adapted, although not without difficulty, to do part of the job of storing and retrieving the virtual environment information.

Figure 12:
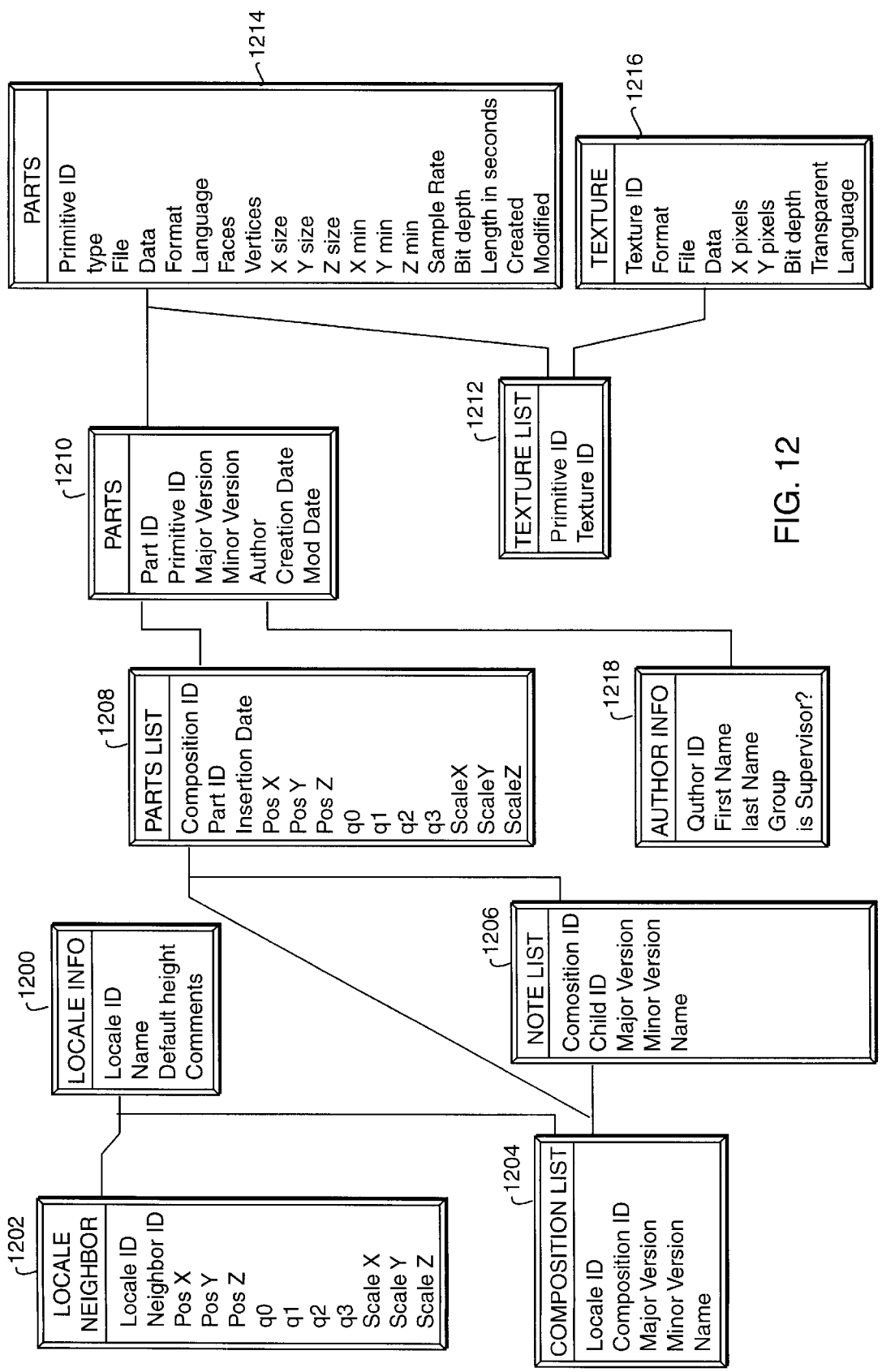
FIG. 12 is a diagrammatic representation of how both the structure and data of a virtual environment scene could be stored completely in a single database.

FIG. 12 shows an example database design or "schema" which would allow the storage of both the data and the structure of the virtual environment in a single database. Even though the data is stored all in one place, the use of a database makes it possible to query, or extract, small pieces of information at a time either for modification or viewing. In addition, with the schema shown in FIG. 12, it is possible to extract an entire virtual environment in a single file, except the texture maps, using the VRML format simply by traversing the database and building the file. Texture maps would still have to be retrieved independently using VRML.

The Locale Info table 1200 contains information about a "locale" which is defined as a single section of a virtual environment which can be viewed independently, but is usually viewed simultaneously with all neighboring locales. Locales are defined and described in detail in an article titled "Locales: Supporting Large Multi-user Virtual Environments" in IEEE Computer Graphics and Applications, November 1996 by John Barrus and Richard Waters.

The Locale Neighbors table 1202 defines the relationships between Locales allowing a virtual environment designer to create a large scale seamless virtual environment. These two tables relate to the structure of a virtual environment which is usually stored directly in an executable program 1108.

The Composition List table 1204 contains a list of all compositions in a given locale. A composition consists of either a single object or part, or a hierarchy of parts. The combination of the Composition List table 1204, the Node List table 1206 and the Parts List table 1208 define the hierarchy of the objects or parts in the scene in a single locale.

The Parts table 1210 contains information about a single object or part. Each part is made of one or more primitives stored in the Primitives table 1214. A primitive might be an audio file or a list of polygons. The Texture table 1216 contains information about the texture maps, potentially including the image itself, but possibly storing the image in an external location, depending on the database used.

Table 1218 contains information about the creator of each part, including the author's name, an ID number used for connecting the Parts List with the Author Info, which group the Author belongs to and whether or not that author is a supervisor.

Using this database structure, it is possible to store all the information about a large virtual environment in one place allowing the following improvements on the current state of the art: ability to request part or all of a virtual environment as needed, ability to lock single objects for modification without affecting the rest of the objects, ability to change the structure of the virtual environment without programming or compiling a program, ability to change the actual data used in the virtual environment depending on the viewer or viewing situation and many others. Although it is not specifically shown in this schema, it is also possible to provide security to limit or allow specific authors and viewers to interact with the virtual environment.

It will be appreciated that FIGS. 13–25 describe one possible way to introduce a virtual environment into a database. This example uses a popular database called Microsoft Access which is available from Microsoft Corp, Seattle Wash. Microsoft Access is a relational database and stores information in linked tables. Although this is one method of storing the information, there are many other types of databases available, including object-oriented and object-relational, which may be just as effective or more effective in some situations as the basis for storing virtual environments. The following descriptions will explain each table and how it is used.

Referring now to FIG. 13, a table 1300 is shown which is called Locale Info. The table 1300 contains a brief description of each locale, including a readable name 1304, an ID number 1306, a number 1308 representing the height of the terrain in the locale and comments 1310 about this locale. Locales can have any name and the names do not need be unique. The locale ID, however, must be unique within a single database. The height information 1308 is used to indicate that if an object is more than, in this case, 3 meters above any polygons representing the ground in this locale, that object is considered outside of that locale. This allows the use of flat polygons to represent a 3-D volume, simply by adding a height to each polygon. It should be clear to anyone familiar with the concept of locales that it is necessary to define a 3-D volume to represent the inside of the locale for determining movement between neighboring locales.

Note that in a typical database, there would be many locales. Diamond Park, the application profiled in the Locales paper mentioned previously, has over 60 locales, including 5 large locales and many smaller locales that serve as links or paths between the larger ones. In other words, a typical Locale Info table would contain more than 100 locales with unique IDs.

The second table 1302 shown in FIG. 13 shows a list of Compositions within all the locales in the database. Of course in this case, there is only a single locale so the locale ID's 1312 are the same for every composition. This CompositionList table shows only the highest level of a composition hierarchy. If there are any compositions in a locale which have children, only the root of that hierarchy will appear in this table and the children will appear in another table.

In FIG. 8, a table 800, a teapot 802, a cube 806 and a cone 804 are shown. The legs of the table 808, 810, 812, and 814 are all children of the table surface 800, and therefore are not shown in the CompositionList table 1302. The CompositionList table 1302 also contains major and minor version numbers 1314 and 1316.

For some time now, it has been possible for computer programmers to work incrementally, saving both current and past work using a program like RCS, Revision Control System, or SCCS, Source Code Control System. Each of these systems allow a programmer to "check out" a piece of code and then, after revisions, "check in" the same code. Upon check-in, the new source is compared with the check-out copy to find the differences. These differences are marked with a version number and stored with the current source. The advantage of this system is that if one makes changes that are unsuccessful and cause a working software program to stop working, it is possible to revert to an earlier version of the software until one finds the problems introduced.

A similar capability would be very useful for content creators and 3-D authors. For example, if one were to create a virtual environment with bold or bright colors and wanted to convert it to be a pastel colored environment, this conversion could take some time and not be easily reversible. Given version control capability would allow the author to revert to the brightly colored environment. The same example could easily be extended to include modeling and texturing changes as well as color modifications.

The minor and major version numbers 1314 and 1316 in the CompositionList table 1302 allow a rudimentary method of version control for the content creators. Normally, when an environment is extracted from the database for viewing, all of the latest versions of each composition, part and primitive would be extracted. However, upon request by the user, the earlier versions could also be extracted and viewed. In fact, a changing sequence of parts could be reviewed by extracting all versions of a part and displaying them side by side. Note that the rest of table 1302 is self-explanatory.

Figure 14:
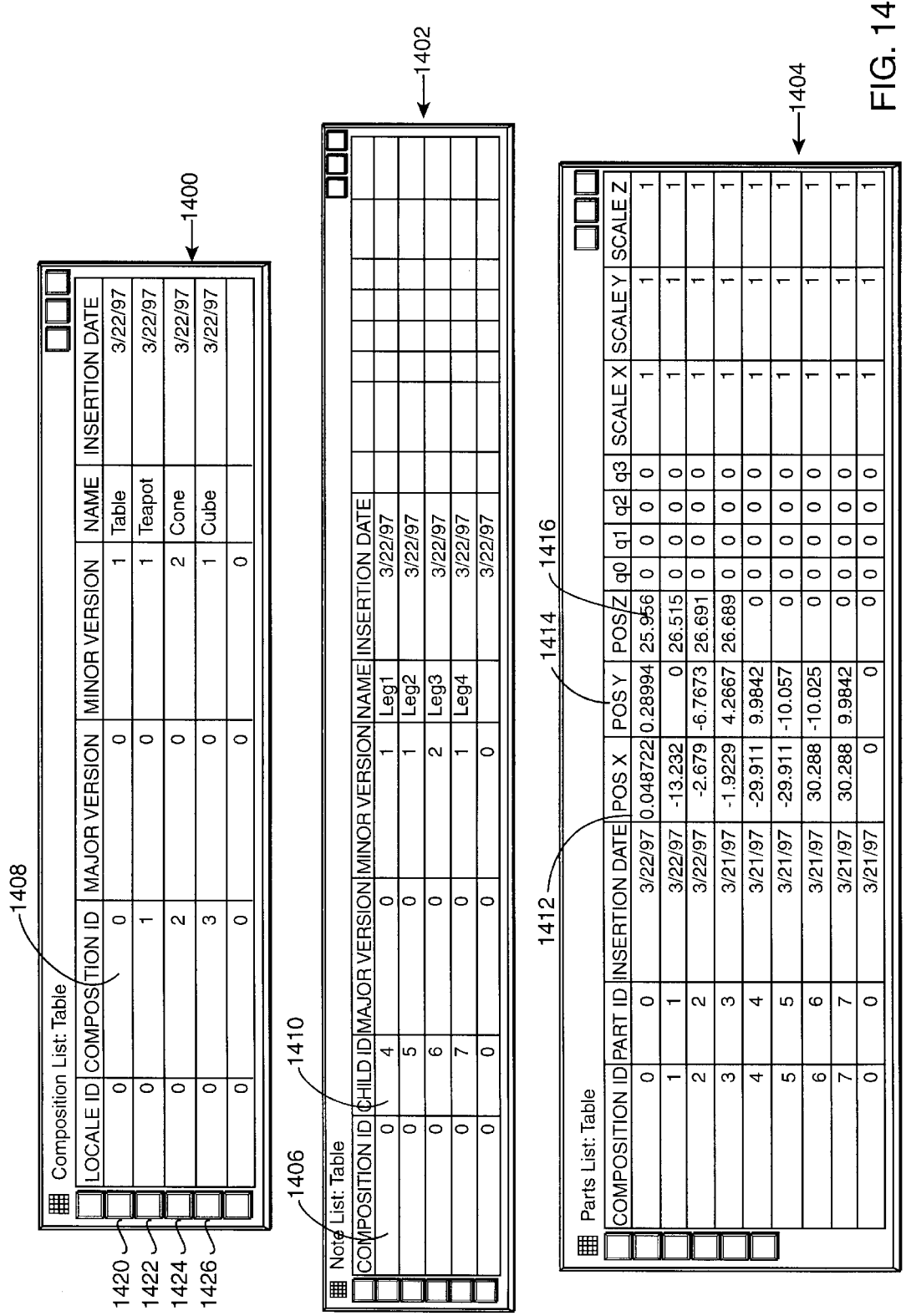

Referring now to FIG. 14, the CompositionList table 1400 is shown in this figure for convenience. The Node List Table 1402 contains the internal structure of the hierarchies whose root nodes are shown in the CompositionList table 1400. Only composition ID 0 1406 and 1408, which represents the table top 800 in FIG. 8, has any children, so the composition ID is the same throughout the entire Node List table 1402. The table top 800 has 4 children shown in the Node List table 1402. The Child ID 1410 is also a composition ID used in the Parts List table 1404 and so cannot be a duplicate with another composition ID in tables 1400 or 1404.

Notice the columns called Pos X 1412, Pos Y 1414 and Pos Z 1416. These columns describe the location of the parts in the locale with respect to their parent compositions. All of the columns following Pos Z, including q1, q2, q3, q4 and Scale X, Y and Z 1418 describe the orientation and relative scale of the part when it used in the hierarchy described in this table 1402.

A book entitled *Computer Graphics: Principles and Practice* written by Jim Foley et al. on pages 213–226 describes 3-D geometric transformations and how they can be used to move objects around in a scene and make them bigger or smaller. Many 3-D objects, when they are initially built, are designed around the center of a local coordinate system. For instance, a sphere is most easily defined as a center point and a radius. Often that center point is taken to be at the origin of the local coordinate system (0,0,0). When that sphere is used in a virtual environment, it might be desirable to place 10 copies of the sphere around a circle which centers a few meters from the origin of the virtual environment. In that case, as described in Foley et al., it is possible to define a set of transformations or 4×4 matrices representing displacement, reorientation and scaling which will move those spheres into their correct locations within the virtual environment.

Sometimes transformations are stored as matrices. At other times it is convenient to store those transformations in their component parts, including x, y and z displacement, rotation and x, y and z scaling. For this example, the database is shown to contain the latter is shown, it would be trivial to store matrices instead of the components in this database. Of course, it is possible and sometimes desirable to store both components and matrices along with a flag indicating which to use. For this example, the component parts are shown so that the positional changes are easily seen.

Table 1404 shows transformation information. These transformations are used to move parts with respect to the virtual environment and with respect to each other. For animation, it is possible while the scene is redrawn over and over, to change the transformations. A sphere whose X position is increased and decreased over time will seem to be moving up and down the X axis in the virtual environment. However, the rest position of the sphere should be stored in the database so that when someone loads the virtual environment into their computer in order to view the virtual environment, they will see the sphere in the correct position.

Transformations are specified with respect to an existing coordinate system. For instance, if an object is in the Locale's coordinate system and a transformation is applied, that object is moved to a new location in the Locale's coordinate system. If the object has the identity transformation, which means that displacement is zero, scaling is unity, and rotation is equal to no rotation, and the object is in the Locale's coordinate system, the origin of the object's coordinate system will coincide exactly with the origin of the coordinate system of the locale. If the object is a child of a parent object and has an identity transformation, the object's coordinate system lines up with the coordinate system of the parent, regardless of how the parent has been transformed with respect to the coordinate system of the Locale. Note that transformations used in this way are well understood in the graphics industry and used extensively by those skilled in the art of designing and rendering 3-D models using computers.

Figure 15:
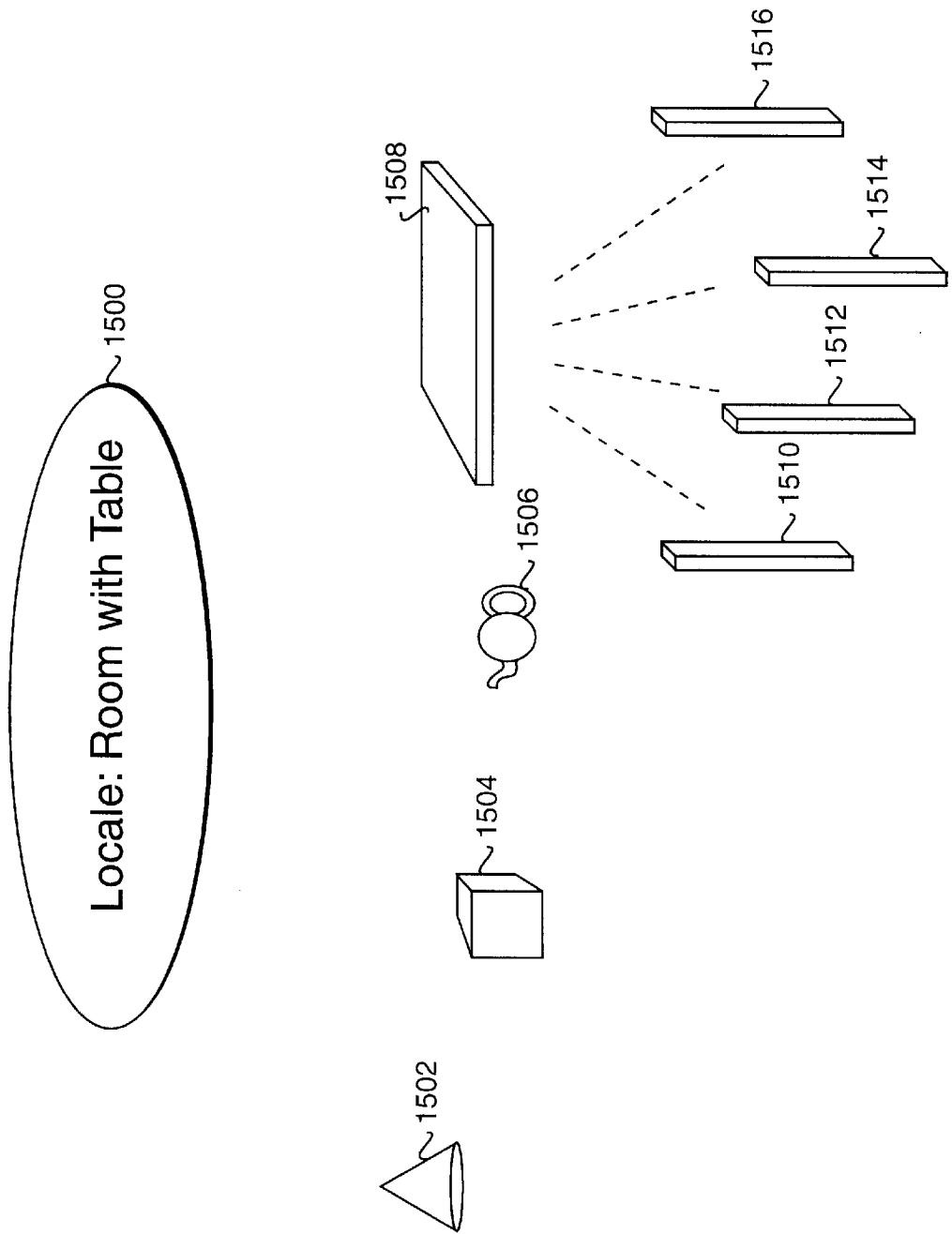
FIG. 15 is an example object hierarchy as contained in the example database illustrated in FIG. 14.

FIG. 15 shows the hierarchy of the simple example of a virtual environment of FIG. 8. This hierarchy also corresponds to the data in the database as shown in FIG. 14, tables 1400, 1402 and 1404. For instance, table 1400 shows that the compositions contained in Locale 0 1500 are the cone 1502 which is shown in row 1424, the cube 1504 which is shown in row 1426, the teapot 1506 which is shown in row 1422 and the table top 1508 which is shown in row 1420. Notice that the legs are not contained in table 1400 because they are not in the top level of the scene hierarchy. Looking now at table 1402 in FIG. 14, legs 1 through 4 shown in rows 1428 and also as objects 1510, 1512, 1514 and 1516 in FIG. 15 are children of the table top composition 1508 shown in row 1420.

The transformations relating to each part of the compositions are stored in the Parts List table 1404 which associates nodes of the compositions with individual parts. As will be seen in the remaining figures, each of the legs is actually drawn in a different position with respect to the origin of the table top's 1420 and 1508 coordinate system. The displacements are shown in columns 1412, 1414 and 1416.

Referring now to FIG. 16, the Parts List table 1600 contains the relationships between the nodes of the composition and the individual parts. As shown in the Parts table 1602, each part has version information, columns 1606 and author information, column 1608, along with dates of initial creation and latest modification in columns 1610. Each part is also associated with primitives listed in the Primitives table 1604. This association is recorded in columns 1612. This method of describing relationships between tables is one of the principle concepts in relational databases and will be recognized as such by anyone skilled in the art of developing and populating databases.

Referring back to FIG. 12, one can see the overall structure of the database, including the relationships between all the tables.

The Primitives table 1604 contains a list of objects or primitives used in the example virtual environment. Even though there are four different parts representing table legs, rows 1614, shown in the Parts table 1602, those legs are all drawn using the same 3-D information 1616 stored in the Primitives table 1604. Looking at row 1616, it is seen that there is a primitive ID 1618 which provides the link to the Parts table 1602, a primitive type 1620 which indicates what type of 3-D object it is. There is a column 1622 which holds the name of the data file if the data is not stored directly in the database as a Binary Large OBject or BLOB. If the data is in the database in column 1624, the filename in column 1622 becomes redundant. The format column 1626 indicates how to interpret the data stored in the file or the data column 1624.

The language column 1628 requires a more detailed description. Often, texture maps which are used to represent billboards or advertisements in a virtual environment such as those shown in FIGS. 5A and 5B will contain text written in a specific language. It is also possible to create shapes which represent symbols by building a 3-D version of the symbol. For instance, the capital letter "T" could be created using polygons in the shape of the letter and then extruded for depth. It could be that in the Japanese or Chinese version of this environment one would like to create the Kanji symbol that represents the individual and show that in place of the Roman letter "I". By specifying the language represented by an object or texture map, it is possible to create additional symbols for another country without replicating the entire database.

For instance, when displaying a virtual environment in Japan, as the database engine extracts information from the database, it follows relationships down into the Primitives table 1604. Upon finding a primitive with the correct Primitive ID in column 1618, it checks to see if the Language column 1628 equals "Japanese". If not, it continues its search for a primitive with the same ID, but with language equal to "Japanese". An asterisk in the Language column 1628 would indicate that the primitive is useful in any language and upon finding the right primitive with an asterisk in the Language column, the database engine would deliver that primitive to the requester.

It should be clear to anyone who has developed a virtual environment to be deployed in more than one country the advantages of marking primitives by language and modifying just those primitives that require modification. The current practice is to recreate the entire database in another directory of the file system and then systematically search for language specific files, e.g. texture maps, audio or models, and modify those files. Not only does the current practice waste disk space, but it also creates a management headache as the authors try to maintain consistency between two separate directories where most of the information stored in those directories is the same.

The rest of the information stored in the Primitives table 1604 is information that can be extracted from the data file or data BLOB 1624, but for convenience is stored as a column in the table. Columns 1634 and 1636 are used to indicate the extent of the models and can be used to query the primitives list in interesting and useful ways. Using the information in those two columns, it is possible to look for all parts which are located within a 5 meter radius of a certain object in a locale. Current practice requires the opening of all files or the complete analysis of all data BLOBs before determining the answer to such a query. Using the information in columns 1634 and 1636 it is possible to return a list of parts or the data for the parts without searching through files or the BLOBs.

Referring now to FIG. 17, column 1704 refers to authors contained in table 1702. Again, as is standard in the relational database industry, instead of repeating all of the author information in each row of table 1700 and risking the introduction of erroneous information and confusion, the author information is stored in a Parts table 1700. For convenience, the author's last name is shown in column 1704 even though the ID is actually stored in the table 1700.

Typically, table 1702 will contain much more information about each author, but it is unnecessary to show more information because it is understood that the requirements for each company using this type of database will be different and table 1702 might be modified accordingly.

Figure 18:
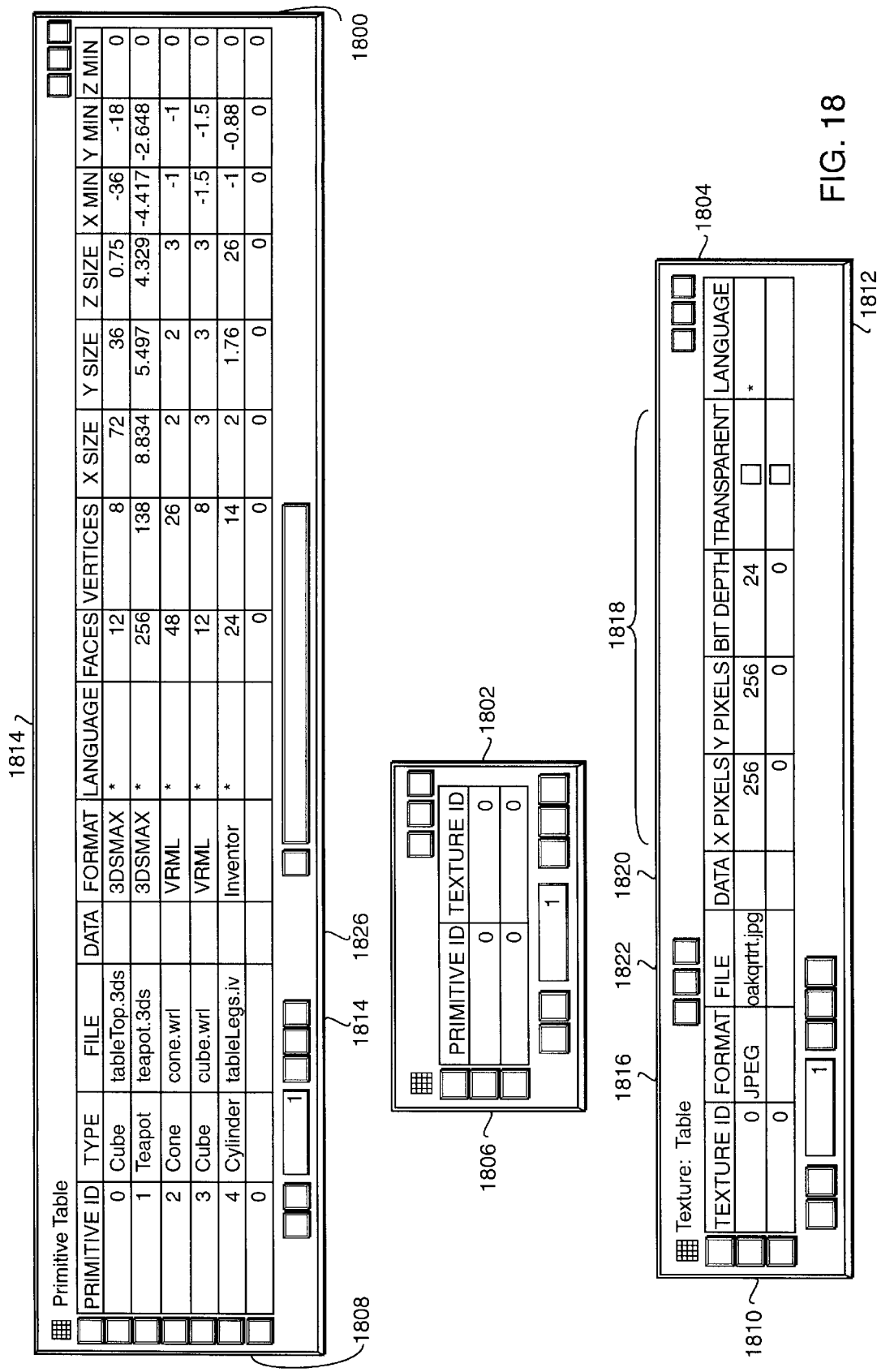

Finally, as shown in FIG. 18, each primitive may be associated with zero or more textures. Some primitives will use the texture maps used by other primitives and some primitives will use more than a single texture map. This relationship between primitives and texture maps is contained in Texture List table 1802. In this case, only Primitive 0 1808 and Texture map 0 1810 have a relationship. Texture map 1810 is used in Primitive 0 to create a wood textured appearance on the table top.

It will be appreciated that all of the rows like row 1806 which show an asterisk in the first darkened column are empty rows which serve as placeholders for adding new information. Even though row 1806 shows a relationship between Primitive ID 0 and Texture ID 0, this is not a valid row in the database and would have to be modified before being committed to the database.

Notice that the Texture table 1804 has a column called Language 1812. This column is used in the same way as the language column in the Primitives table 1814. Additional columns may be added that describe specific attributes of the primitives or texture maps for sorting or filtering without violating the spirit of this invention. The format column 1816 has a similar use.

The file 1822 and data 1820 columns contained in the Texture table 1804 are just like the equivalent columns 1824 and 1826 in the Primitives table 1800 and the description of those columns for FIG. 17 applies in this case as well.

FIG. 19 shows an example VRML format for the cube which is used as primitive 3 in FIG. 18. There is color and appearance information in this file 1900 as well as a list of vertices 1902 and faces 1904. Although this information could also be extracted and stored in the same database by creating and populating additional tables, it is unlikely that this increased granularity of information would add any value and it will definitely decrease the speed at which the information can be extracted from the database.

It will be appreciated that the example database format and schema described above and shown in FIG. 12 through FIG. 18 is only an example and is the current best mode of implementation. It is possible and likely that as the virtual environment database is refined, some of the fields stored in the database will change, some will be added and some deleted or moved to other tables as appropriate. It will also be appreciated that there are other types of databases that might be better suited for storing this type of information, specifically object-oriented databases like Poet from Poet Software of San Mateo, Calif., Versant from Versant Object Technology, Inc. of Menlo Park, Calif., or Jasmine from Computer Associates of Alameda, Calif. Object-oriented databases have a slightly different storage scheme, very different caching schemes and different ways of accessing and transmitting information. Moving to an object-oriented database is still consistent with the nature and intent of this invention and is thus within the scope of the subject invention.

Figure 20:
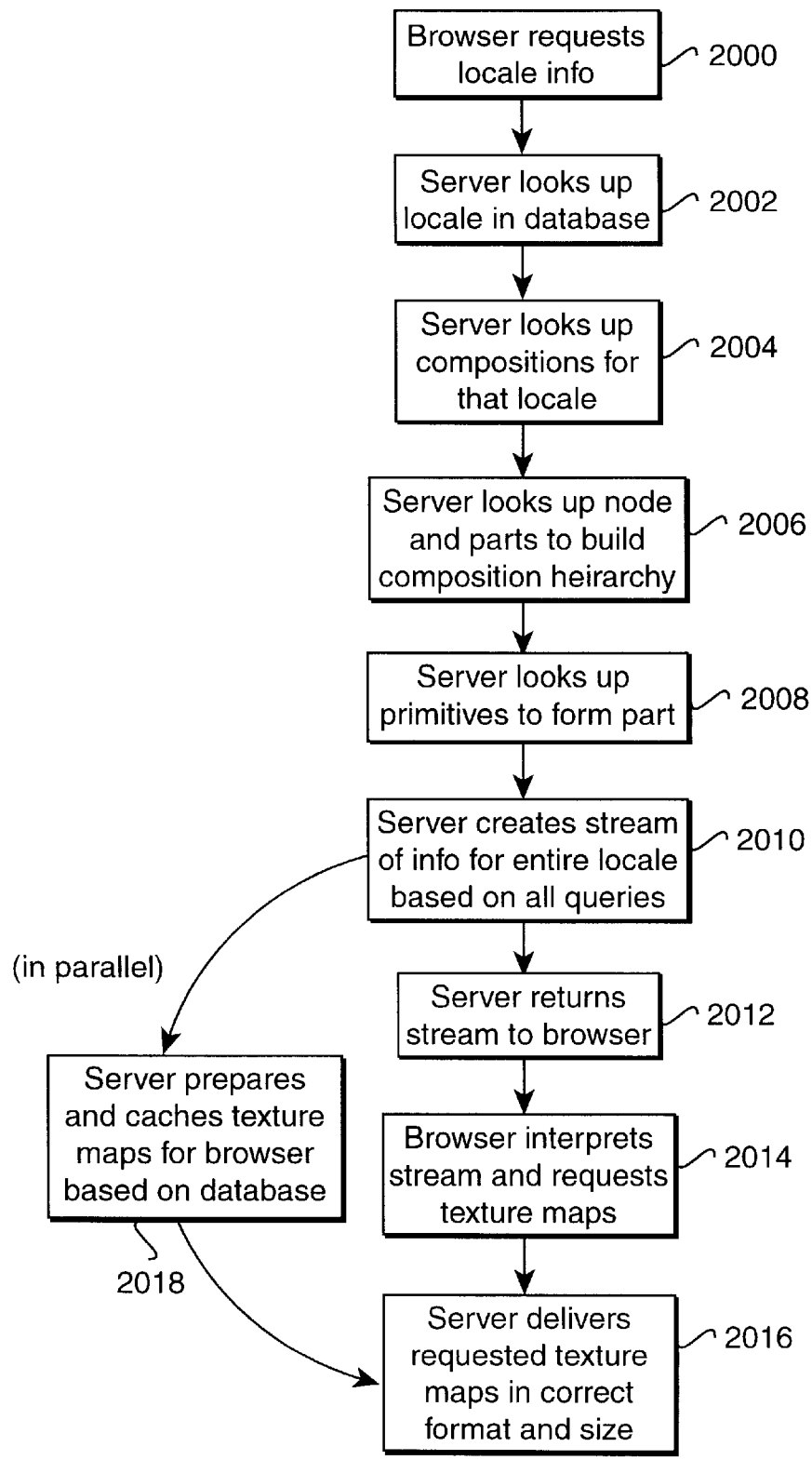
FIG. 20 is a flow chart which shows how information is retrieved from the database.

Referring now to FIG. 20, a flow diagram is shown which represents the exchange of information between a browser and the server. A browswer is a program requesting 3-D information, like the CosmoPlayer VRML browser plug-i from Silicon Graphics, Inc. of Mountain View, Calif. The server is the combination of the communications program and database. There are many servers for 2-D information, including servers from Netscape Communications in Mountain View, Calif. Most of these servers respond using the HTTP protocol which was made famous by the World Wide Web and serve streams of information, usually file based, which contain either HTML code and text, graphical information in either the GIF or JPG format, or VRML files which contain 3-D information as described before.

The server referred to in box 2002 extracts its information out of the database shown in FIGS. 12–18, converts that information into some data stream of the requested model format and sends it back to the browswer mentioned in box 2000.

In one embodiment, at 2000, the browser sends a message to the server requesting specific 3-D information about a particular locale described in the server's database. This request would include the address of the requesting machine, usually in the form of an internet address, and characteristics of the machine, which are typically sent as "cookies" from the browser. A "cookie" is a generic term describing little packets of information which are stored on the browsing computer and passed to servers when data requests are made. The cookies sent by the browser at 2000 might include specification of the preferred texture map file format, what type of graphics hardware is on the machine, desired frame rate for the 3-D environment, and other relevant information.

At 2002, when the server receives the request for information, it begins a series of lookups or data extraction from the database. At 2002, the server looks at the Locale Info table 1200 to find the Locale ID number. Using this ID number, at 2004, the server extracts a list of root composition nodes from the CompositionList table 1204. At 2006, the server continues extracting the virtual environment information by looking in tables 1206 and 1208 to find hierarchies and Part ID's in order to build the structure of the virtual environment. Then, the server looks up a list of primitives from the Parts table 1210 in order to find out which geometry is used in this Locale. At 2008, the server searches the Primitives table 1214 and extracts information needed to build the final buffer or stream representing all of the 3-D information in the requested Locale. That buffer of information is created at 2010.

At 2012, the server takes that buffer of information which represents the complete information about the locale except the texture map images, and sends it over the network to the browser. In parallel, at 2018, the server begins to convert and retrieve the texture maps used in the locale, knowing that the next step for the browser is to request the texture maps using the HTTP or similar well known protocol to the browser in order to answer its requests.

Figure 21:
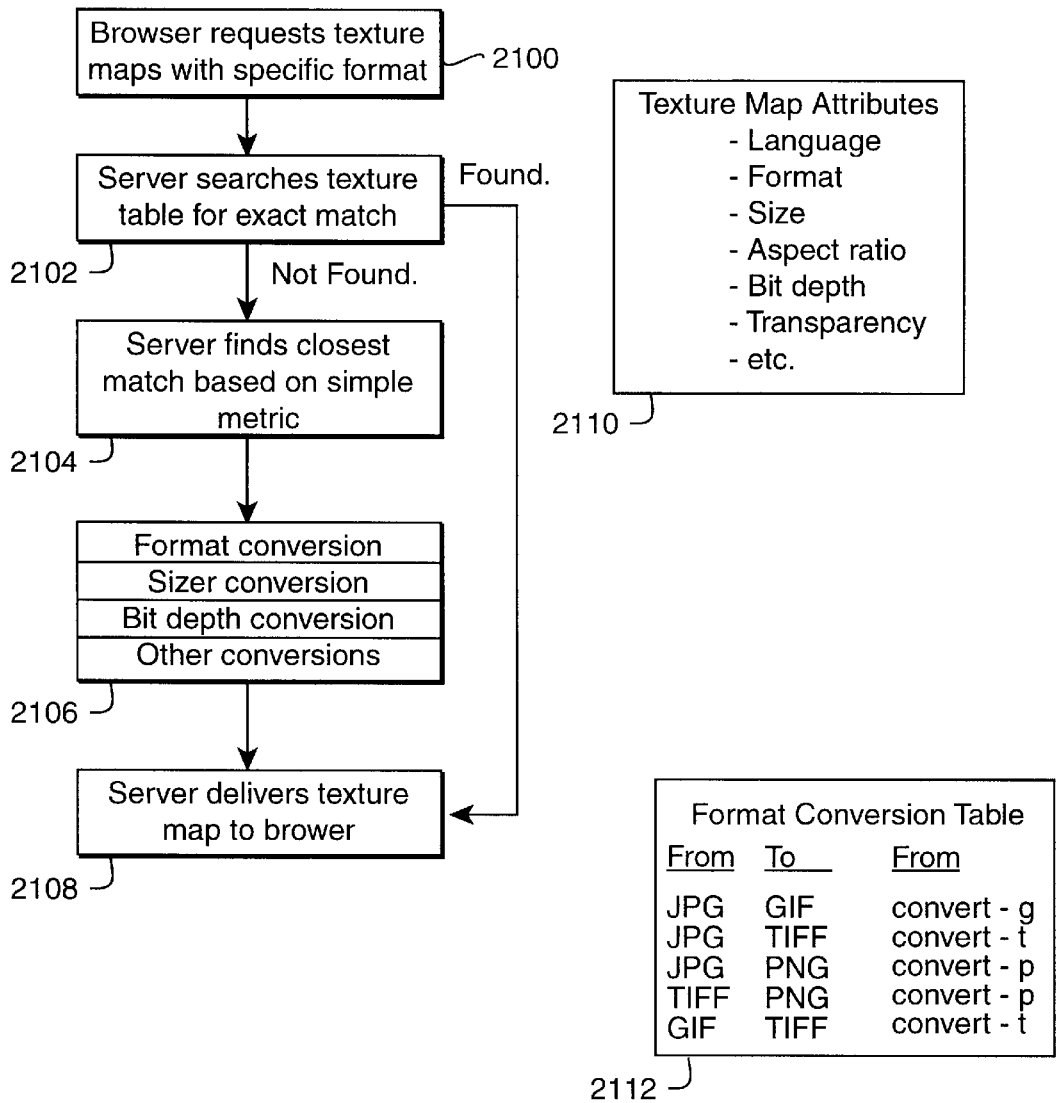
FIG. 21 is a flow chart showing how the server determines what to send a browser when a texture map is requested.

Referring now to FIG. 21, a flow diagram is shown which represents one possible flow of information during the browser's request for a texture map. In one embodiment, at 2100, the browser uses the HTTP protocol to request a specific texture map. Again, cookies are sent from the browser to the server to indicate graphics hardware and other relevant information. Using this information, at 2102, the server begins to search through the Texture table 1216 to find a texture map with the right texture ID which matches all of the attributes contained in or derived from the cookies sent by the browser. For instance, the browser may have indicated that the user of the browser speaks English, that the software requires JPG format images at low resolution, and that the images should have a square aspect ratio. Other attributes might also be specified by the browser. In addition, it is possible that some of the attributes might be specified as acceptable in one of several formats or in any available format. For instance, particular browsers might accept JPG, GIF, TIF, RGB, or one of many other image formats and the first texture map that matches the other attributes could be sent in response.

At 2102, if an exactly matching texture map is found, the server immediately proceeds to the step shown at 2108 and delivers the data for that texture map to the browser. If an exact match is not available, the server looks through the texture table 1216 to find a close match. A close match would be defined as one whose texture ID is the same, but where some of the other attributes do not match exactly the attributes requested by the browser. It is possible that there is a best match which can be determined using some set of rules, but in one embodiment, any close match could be considered can acceptable match. Once a close match is found, at 2106, the server can consult one of several format conversion tables which contains the commands required to convert specific attributes of the texture map into the requested attribute. For instance, a program called Image Alchemy from Handmade Software in Fremont, Calif., has the capability to convert between different formats, resolutions, aspect ratios, bit depths and a number of other attributes. Such a program could be used by the server to do the conversion step at 2106. Of course, after the conversion, at 2108, the server delivers the final image data to the browser using HTTP or other protocol.

The same type of attribute conversion can be done to models, including format conversion, using a program like InterChange from Syndesis Corp of Jefferson, Wis. FIG. 22 shows several possible model attributes that can be included in the primitives or parts tables 1210 and 1214. For the example, only the Language, Face count, and Vertex count attributes are shown.

Notice that if the primitive in table 1214 is an audio file, different attributes are stored, including sample rate, bit depth and length of the audio file. None of these apply to model primitives. The type of attribute information stored in the database depends on the type of primitive.

FIGS. 23A, 23B and 23C show a teapot constructed at three different resolution levels. Although they represent the same thing, the low resolution teapot 2304 looks much more crude than the high resolution version 2300. Both are recognizable as teapots and could be used as such in a virtual environment. Often an artist will construct multiple versions of the same model as shown in these figures in order to reduce the number of polygons drawn when an object is far away from the viewer in a virtual environment. However, in this invention, multiple models at different resolutions are used for different graphics hardware in order to maintain interactive frame rates at 10–15 frames per second.

FIG. 24 shows three different existing hardware platforms with approximate performance numbers including how many polygons can be drawn in a second and how much texture map memory is available on that platform. Each of these platforms might be used to access a the 3-D database described herein.

Figure 25A:
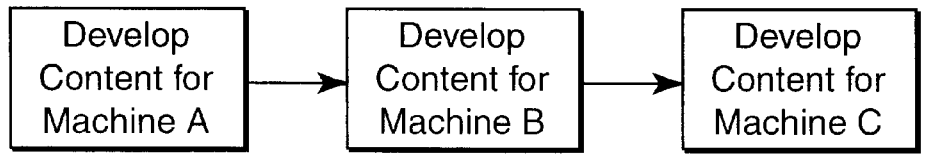
FIGS. 25A and 25B are diagrammatic illustrations showing a comparison of the way that content is developed for multiple platforms; and, FIG. 26 is a diagrammatic illustration indicating some of the different pieces of the invention described in this document and how they interconnect.

FIG. 25A shows how content for multiple hardware platforms like those shown in FIG. 24 is developed today. Typically, the content creators will choose a hardware platform here indicated as Machine A and develop content for that one platform. Then, they will copy all of that content to another directory in their development platform file system and begin to modify that content for the second hardware platform here designated as Machine B. The modifications would include reducing or increasing the number of polygons in each model and changing the resolution or format of texture maps and audio files.

Figure 25B:
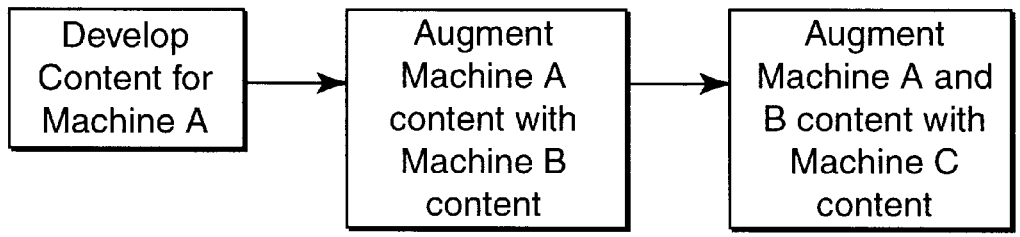

With the system described here and the process discussed in FIG. 25B, after the development of the initial content, some of the content is converted dynamically after the request, and only a little bit of the content has to be modified by hand in order to allow another hardware platform to display the virtual environment.

Figure 26:
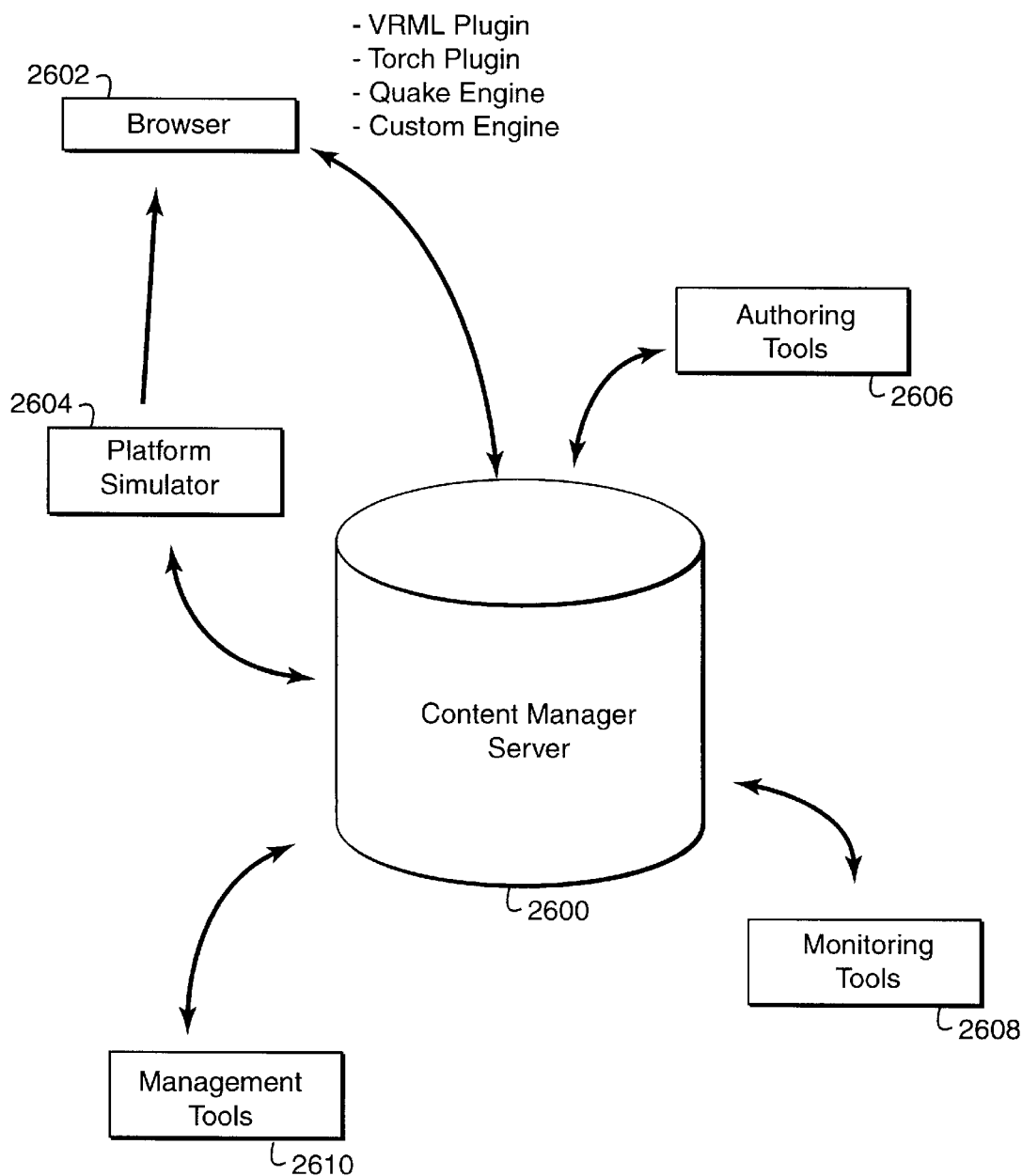

Looking now at FIG. 26, it should be apparent that the HTTP web protocol is only useful for the situation of the browser 2602 communicating with the server 2600 which is also referred to as the Content Manager because it helps manage the contents or assets for the virtual environments. Note, the monitoring and management tools 2606 and 2608 are to be understood as tools usually available for managing databases in other situations, but do not use the HTTP protocols. Additionally, authoring tools have extensive two way communication with the data storage, whether it be the file system or a database.

A program listing for the subject system appears in the Appendix hereto.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A virtual reality system, comprising:
   a computer for generating a virtual reality environment;
   a database for storing data representing said generated virtual reality environment; and
   a database engine for accessing said database and delivering a portion of the stored data representing the generated virtual reality environment without delivering another portion of the stored data representing the generated virtual reality environment.

2. The system of claim 1, wherein said database is a relational database and the virtual reality environment is a 3-D environment.

3. The system of claim 1, wherein;
   said virtual reality environment is formed of different parts,
   each part is stored in a different record in the database so that each different record is deliverable independent of the other records, and
   the database engine is configured to access and deliver data in a selected one of the records without delivery of data in other of the records.

4. The system of claim 3, wherein said parts are locales.

5. The system of claim 3, wherein the database engine is configured to access each different record of said database individually.

6. The system of claim 1, wherein said database has stored therein a number of versions of said virtual reality environment and further comprising:
   a network; and
   a target machine coupled to said network, said target machine having a predetermined configuration;
   wherein the database engine transmits to the target machine only that version of said virtual reality environment stored in said database which is compatible with the predetermined configuration.

7. A method for delivery of information comprising the steps of:
   representing, in a relational database, an aspect of a virtual reality with a first set of information corresponding to a first quality level and a second set of information corresponding to a second quality level, said first set of information different than said second set of information;
   delivering said first set of information from the relational database to a first device; and
   delivering the second set of information from the relational database to a second device.

8. The method as recited by claim 7, wherein said virtual reality environment is a 3D environment.

9. The method as recited by claim 7, wherein said aspect of the environment is texture.

10. The method as recited by claim 7 wherein said first and second device are coupled in communication with each other over a network.

11. The method as recited by claim 10, wherein said network is a wide area, distributed network.

12. The method as recited by claim 10, wherein said first set of information is delivered over said network.

13. The method as recited by claim 7, wherein said first set of information is delivered by recording the first set of information on a medium and transporting said medium to said first device for reading by said first device.

14. The method as recited by claim 7, further comprising the step of:
   communicating first characteristics of said first device and communicating second characteristics of said second device;
   wherein the first set of information is delivered responsive to communication of the first characteristics and the second set of information is delivered responsive to communication of the second characteristics.

15. The method as recited by claim 14, wherein said first device and said second device are simulated on said third device.

16. A virtual reality environment comprising:
   a first database record stored on a computer readable medium having stored thereon a first set of information representing an aspect of said virtual reality environment corresponding to a first quality level; and
   a second database record stored on a computer readable medium having stored thereon a second set of information representing said aspect of said virtual reality environment corresponding to a second quality level, said first set of information different than said second set of information.

17. The virtual reality environment as recited by claim 16 wherein said aspect of a virtual reality environment is texture.

18. A method of updating a virtual reality environment, comprising the steps of:
   reading a first database record having stored therein a first set of information representing an aspect of a generated virtual reality environment;
   altering said first set of information; and
   storing said altered first set of information as said first database record without storing other records relating to said generated virtual reality environment.

19. The method as recited by claim 18, wherein said aspect of the virtual reality environment is texture.

20. A system for executing a virtual reality environment, comprising:
   a database for storing a virtual reality environment;
   a first device for requesting access to the stored virtual reality environment and for communicating a characteristic; and
   a second device for receiving the communicated request and the communicated characteristic, for retrieving the stored virtual reality environment, and for communicating said retrieved virtual reality environment to said first device, said communicated virtual reality environment tailored dependent on said characteristic.

21. The system as recited by claim 20 wherein said step of communicating a characteristic of said first device occurs in response to a request from said second device.

22. The system as recited by claim 20 wherein said characteristic of said first device is communicated with said request for access to a virtual reality environment.

23. The system as recited by claim 20 wherein said characteristic is texture.

24. The system as recited by claim 20 wherein said characteristic is a characteristic of said first device.

25. The system as recited by claim 20 wherein said characteristic is a characteristic of a target device to be simulated by said first device.

26. The system as recited by claim 25 wherein a user of said first device defines said characteristic prior to transmission to said second device.

27. A database for storing a virtual reality environment, comprising:
   a first data representation representing a first part of a virtual reality scene having a first graphical object;
   a second data representation representing a second part of the virtual reality scene, different than the first part, having a second graphical object; and
   wherein the first data representation and the second data representation are independently retrievable from the database.

28. A database according to claim 27, wherein:
   the first and the second data representations form a portion of a plurality of data representations representing the virtual reality scene in its entirety; and
   the number of data representations forming the plurality of data representations is variable.

29. A database according to claim 27, wherein the first data representation and the second data representation correspond to a first image resolution, and further comprising:
   a third data representation representing the first part of the virtual reality scene; and
   a fourth data representation representing the second part of the virtual reality scene;
   wherein the third data representation and the fourth data representation correspond to a second image resolution different than the first image resolution.

30. A database according to claim 27, wherein the first data representation and the second data representation correspond to a first image format, and further comprising:
   a third data representation representing the first part of the virtual reality scene; and
   a fourth data representation representing the second part of the virtual reality scene;
   wherein the third data representation and the fourth data representation correspond to a second image format different than the first image format.

31. A database according to claim 27, wherein the first part includes a texture.

32. A database according to claim 31, further comprising:
   a third data representation representing the first part of the virtual reality scene excluding the texture.

33. A database according to claim 31, wherein the texture includes text, the first data representation represents the first part of the virtual reality scene with the text being first version text, and further comprising:
   a third data representation representing the first part of the virtual reality scene with the text being second version text.

34. A database according to claim 31, further comprising:
   a third data representation representing the texture.

35. A database according to claim 27, further comprising:
   a third data representation representing a relationship between the first data representation and the second data representation.

36. A relational database for storing a virtual reality environment having a plurality of graphical objects, comprising:
   first data identifying one or more graphical objects within at least a portion of a virtual reality scene;
   second data, related to the first data, identifying a location of each of the identified one or more graphical objects within the at least a portion of the virtual reality scene;
   third data, related to the first data, identifying at least one part of each of the identified one or more graphical objects; and
   fourth data, related to the third data, identifying primitives of each of the identified at least one part.

37. A relational database according to claim 36, wherein:
   the first data includes a version identifier.

38. A relational database according to claim 36, wherein:
   the second data includes an identifier of an author of each of the identified one or more graphical objects.

39. A relational database according to claim 36, wherein:
   the third data includes an identifier of an author of each of the identified at least one part.

40. A relational database according to claim 36, wherein:
   the fourth data includes an identifier of a language type of a texture map associated with at least one of the identified primitives.

41. A relational database according to claim 36, wherein:
   the fourth data includes an identifier of an extent of each of the identified primitives.

42. A relational database according to claim 36, further comprising:

fifth data, related to the fourth data, identifying a texture map associated with at least one of the identified primitives.

43. A relational database according to claim 42, wherein:
the fifth data includes an identifier of a language type of the identified texture map.

44. A virtual reality system, comprising:

a network;

a first network device interconnected to the network and configured to communicate, via the network, a request for data representing a part of a virtual reality scene;

a database configured to store data representing the virtual reality scene; and a second network device interconnected to the network and configured to extract from the database only data representing the requested part of the virtual reality scene, and to communicate, via the network, the extracted data to the first network device.

45. A virtual reality system according to claim 44, wherein the second network device is further configured to initially extract, from the database, data representing the requested part of the virtual reality scene excluding textual map images and to later extract, from the database, data representing the textual map images within the requested part of the virtual reality scene.

46. A virtual reality system according to claim 45, wherein the second network device is further configured to initiate communication of the initially extracted data to the first network device and to then initiate extraction of the data representing the textual map images.

47. A virtual reality system according to claim 46, wherein extraction of the data representing the textual map images is initiated during communication of the initially extracted information.

48. A virtual reality system according to claim 46, wherein:
the request communicated by the first network device is a first request;
the first network device is further configured to communicate a second request for the textual map images and information representing one or more attributes relating to the textual map images subsequent to the communication of the initially extracted information; and
the second network device is further configured to extract the data representing the textual map images based upon the information representing the one or more attributes subsequent to receipt of the communication of the second request and of the information representing the one or more attributes, and to communicate, via the network, the extracted data representing the textual map images to the first network device.

49. A virtual reality system according to claim 46, wherein:
the request communicated by the first network device is a first request;
the first network device is further configured to communicate a second request for the textual map images and information representing one or more attributes relating to the textual map images subsequent to the communication of the initially extracted information; and
the second network device is further configured to extract the data representing the textual map images and to convert the extracted data representing the textual map images based upon the information representing the one or more attributes, and to communicate, via the network, the converted data representing the textual map images to the first network device.

50. A virtual reality system according to claim 44, wherein the first network device includes first type graphics hardware and the request is a first request and further comprising:
a third network device, including second type graphics hardware, interconnected to the network and configured to communicate, via the network, a second request for data representing the part of a virtual reality scene;
wherein the second network device is further configured to communicate, via the network, the extracted data to the first network device in a form corresponding to the first type graphics hardware and to the third network device in a form corresponding to the second type graphics hardware.

* * * * *